US009961719B2

(12) United States Patent
Fang et al.

(10) Patent No.: US 9,961,719 B2
(45) Date of Patent: May 1, 2018

(54) INTEGRATED RELAY IN WIRELESS COMMUNICATION NETWORKS

(71) Applicant: ZTE Corporation, Shenzhen (CN)

(72) Inventors: Yonggang Fang, San Diego, CA (US); Bo Sun, Shenzhen (CN); Kaiying Lv, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days. days.

(21) Appl. No.: 14/204,461

(22) Filed: Mar. 11, 2014

(65) Prior Publication Data

US 2014/0254471 A1     Sep. 11, 2014

Related U.S. Application Data

(60) Provisional application No. 61/776,670, filed on Mar. 11, 2013.

(30) Foreign Application Priority Data

May 6, 2013  (WO) ................ PCT/CN2013/075209

(51) Int. Cl.
*H04W 84/04*     (2009.01)
*H04W 48/12*     (2009.01)
*H04W 12/06*     (2009.01)

(52) U.S. Cl.
CPC .......... *H04W 84/047* (2013.01); *H04W 12/06* (2013.01); *H04W 48/12* (2013.01)

(58) Field of Classification Search
CPC .... H04W 16/26; H04W 84/047; H04W 48/12
(Continued)

(56) References Cited

U.S. PATENT DOCUMENTS 7,436,801 B1 * 10/2008 Kanterakis .......... H04W 74/008
                                                370/329
8,243,632 B1 *  8/2012 Oh ........................ H04W 92/20
                                                370/277
(Continued)

FOREIGN PATENT DOCUMENTS

CN       101640892 A       2/2010
CN       102474349 A       5/2012
(Continued)

OTHER PUBLICATIONS

Chinese Office Action dated Nov. 4, 2016 for Chinese Patent Application No. 201310745776.1, filed on Dec. 30, 2013 (7 pages).
(Continued)

*Primary Examiner* — Hassan Kizou
*Assistant Examiner* — Abdullahi Ahmed
(74) *Attorney, Agent, or Firm* — Perkins Coie LLP

(57) ABSTRACT

A wireless communication system comprising a plurality of wireless stations communicating using a first air interface protocol a relay device, and an access point, wherein the plurality of wireless stations communicate with entities in a wide area network via the access point without establishing a direct wireless link with the access point, and wherein the relay device communicates with the plurality of wireless stations using the first air interface protocol and communicates with the access point using a second, different, wireless communication protocol. The second communication protocol, e.g., could be a backhaul protocol that is used by the access point to communicate with other access points in the system.

21 Claims, 24 Drawing Sheets

Infrastructure BSS in Distributed System

(58) Field of Classification Search
USPC .......................................................... 370/315
See application file for complete search history.

(56) References Cited

U.S. PATENT DOCUMENTS

| | | |
|---|---|---|
| 2002/0022483 A1 | 2/2002 | Thompson et al. |
| 2003/0134642 A1 | 7/2003 | Kostic et al. |
| 2003/0169713 A1 | 9/2003 | Luo |
| 2004/0037258 A1 | 2/2004 | Scherzer et al. |
| 2004/0054774 A1 | 3/2004 | Barber et al. |
| 2004/0063455 A1 | 4/2004 | Eran et al. |
| 2005/0059396 A1 | 3/2005 | Chuah et al. |
| 2005/0090255 A1 | 4/2005 | Kuchibhotla et al. |
| 2005/0135317 A1* | 6/2005 | Ware et al. ................... 370/338 |
| 2007/0025379 A1* | 2/2007 | May .................... H04L 47/2433 370/428 |
| 2007/0104165 A1 | 5/2007 | Hanaoka et al. |
| 2008/0037484 A1 | 2/2008 | Sugiura |
| 2008/0089305 A1 | 4/2008 | Yao et al. |
| 2008/0186933 A1 | 8/2008 | Willman et al. |
| 2008/0316997 A1 | 12/2008 | Zeng et al. |
| 2009/0080388 A1 | 3/2009 | Rohfleisch et al. |
| 2010/0014415 A1* | 1/2010 | Moeller .............. H04L 12/2856 370/216 |
| 2010/0061300 A1* | 3/2010 | Hunziker .............. H04W 16/20 370/328 |
| 2010/0220665 A1 | 9/2010 | Govindan et al. |
| 2010/0332647 A1 | 12/2010 | Agulnik et al. |
| 2011/0103284 A1 | 5/2011 | Gundavelli et al. |
| 2011/0116489 A1* | 5/2011 | Grandhi ........................ 370/338 |
| 2011/0188487 A1* | 8/2011 | Seok ............................. 370/338 |
| 2011/0194407 A1* | 8/2011 | Ji .......................... H04B 7/2606 370/226 |
| 2011/0199919 A1* | 8/2011 | Lin ......................... H04B 7/155 370/252 |
| 2012/0170507 A1* | 7/2012 | Sawai .................. H04B 7/0413 370/315 |
| 2012/0250659 A1 | 10/2012 | Sambhwani |
| 2012/0315916 A1* | 12/2012 | Van Phan ............. H04W 36/08 455/442 |
| 2013/0003689 A1* | 1/2013 | Kwon et al. .................. 370/329 |
| 2013/0083661 A1* | 4/2013 | Gupta ................... H04W 4/005 370/235 |
| 2013/0088983 A1* | 4/2013 | Pragada et al. ............... 370/252 |
| 2013/0163463 A1 | 6/2013 | Grayson et al. |
| 2014/0087736 A1* | 3/2014 | Shoshan .................. H04W 4/22 455/437 |
| 2014/0092723 A1 | 4/2014 | Murphy et al. |
| 2014/0119186 A1* | 5/2014 | Wong ..................... H04L 47/30 370/235 |
| 2014/0185580 A1 | 7/2014 | Fang et al. |

FOREIGN PATENT DOCUMENTS

| | | |
|---|---|---|
| CN | 102625317 A | 8/2012 |
| WO | 2011/019975 A1 | 2/2011 |

OTHER PUBLICATIONS

Chinese Office Action dated Jan. 5, 2017 for Chinese Patent Application No. 201410087871.1, filed on Mar. 11, 2014 (6 pages).

* cited by examiner

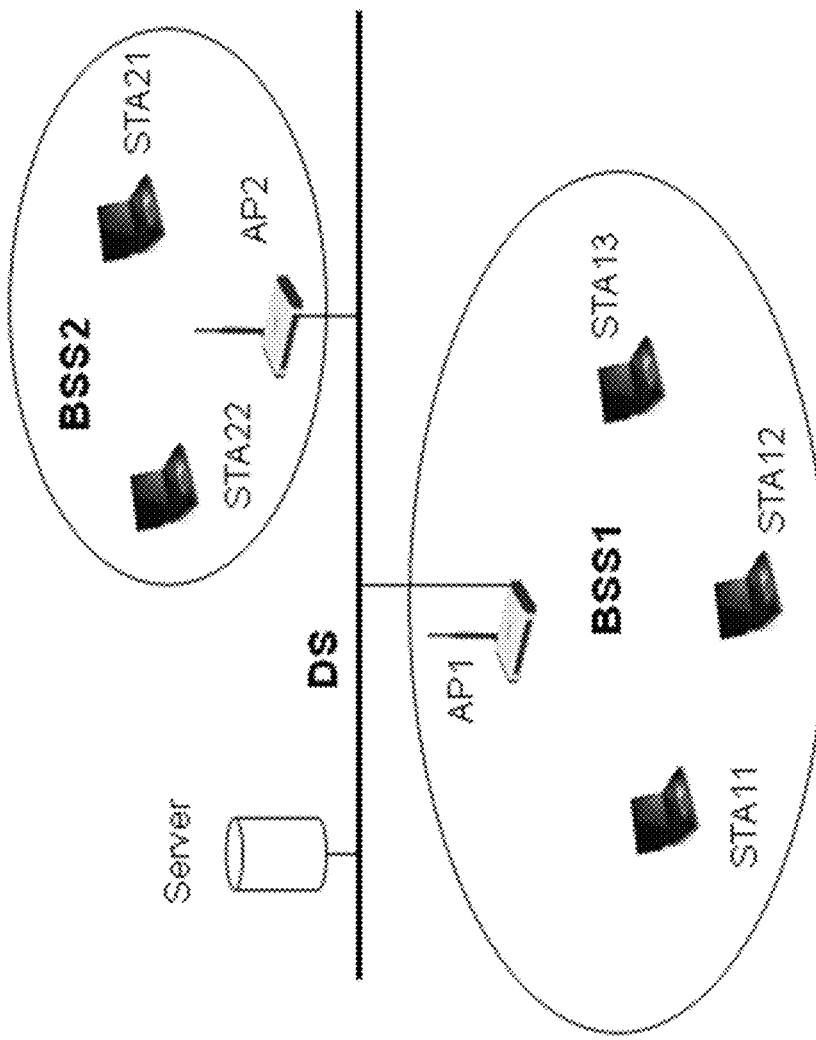
FIG. 1 Infrastructure BSS in Distributed System

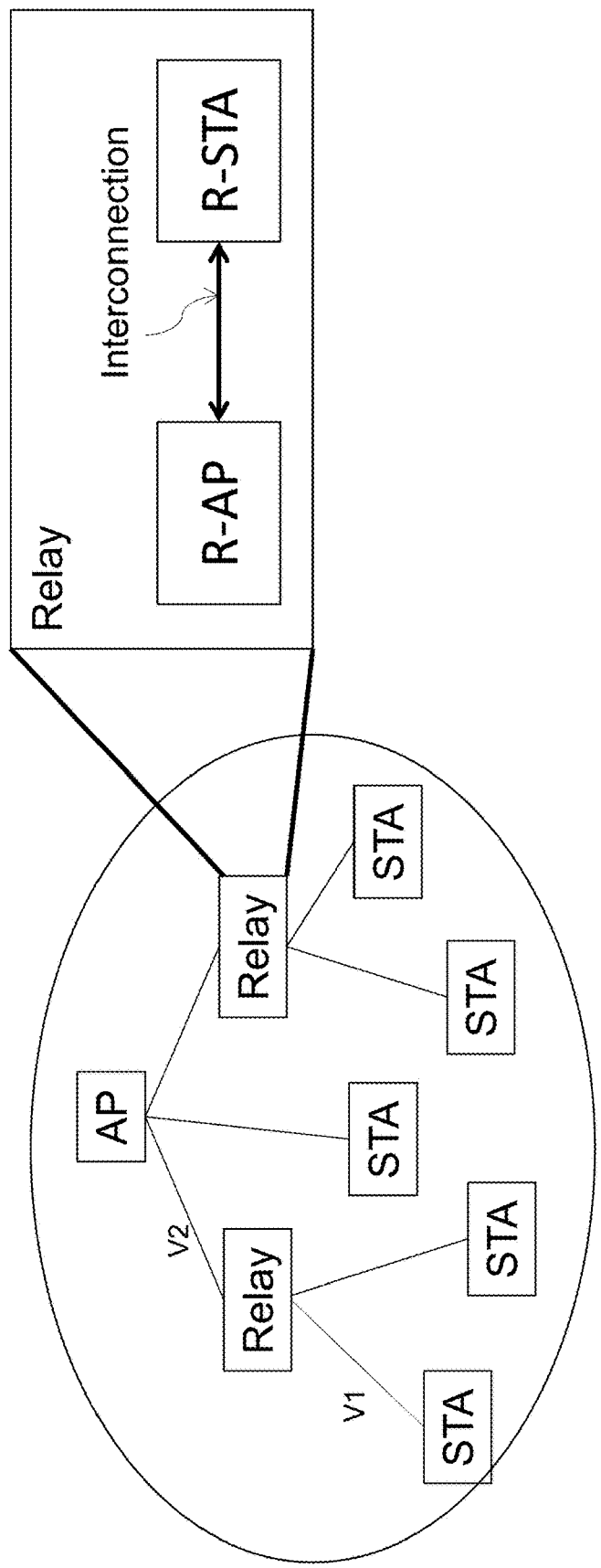
FIG. 2 An example of WiFi Relay Topology

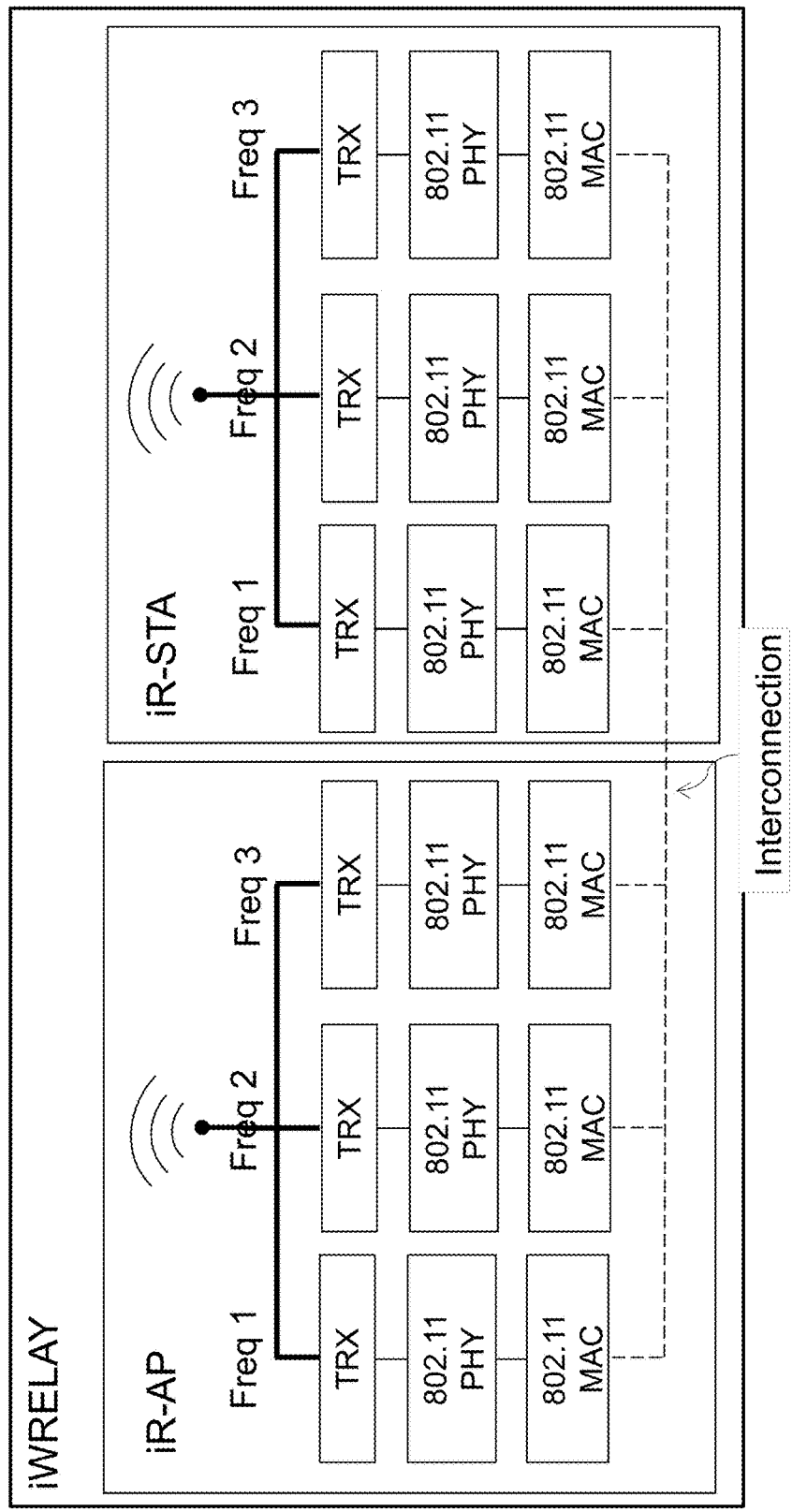
FIG. 3 An example of integrated WiFi relay

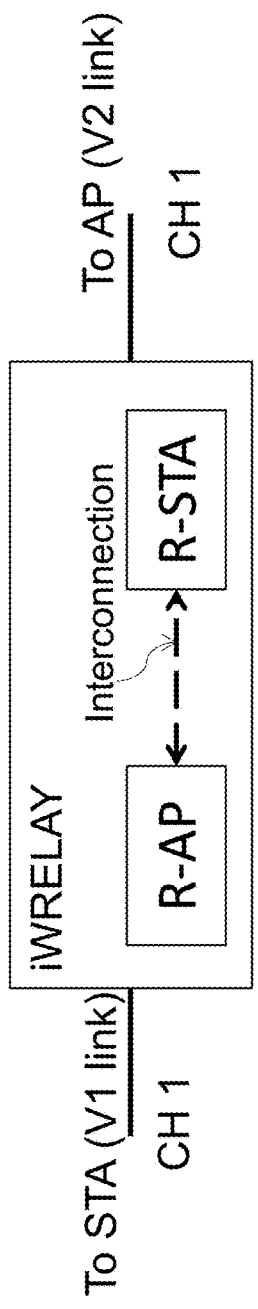
FIG. 4 An example of in-band relay supported by iWRELAY
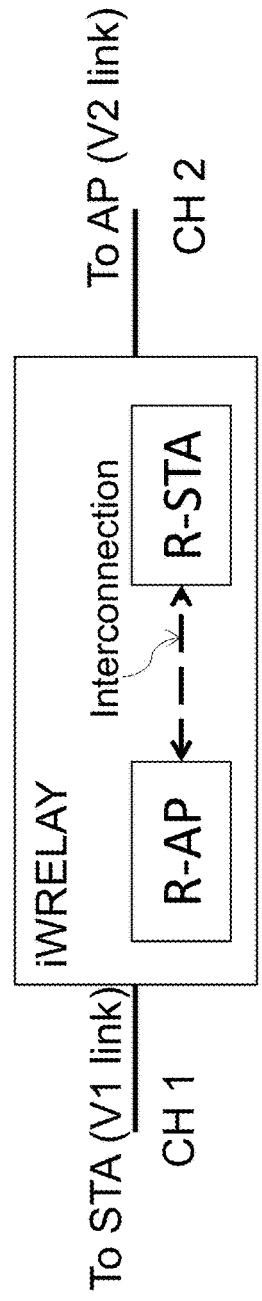
FIG. 5 An example of out-band relay supported by iWRELAY

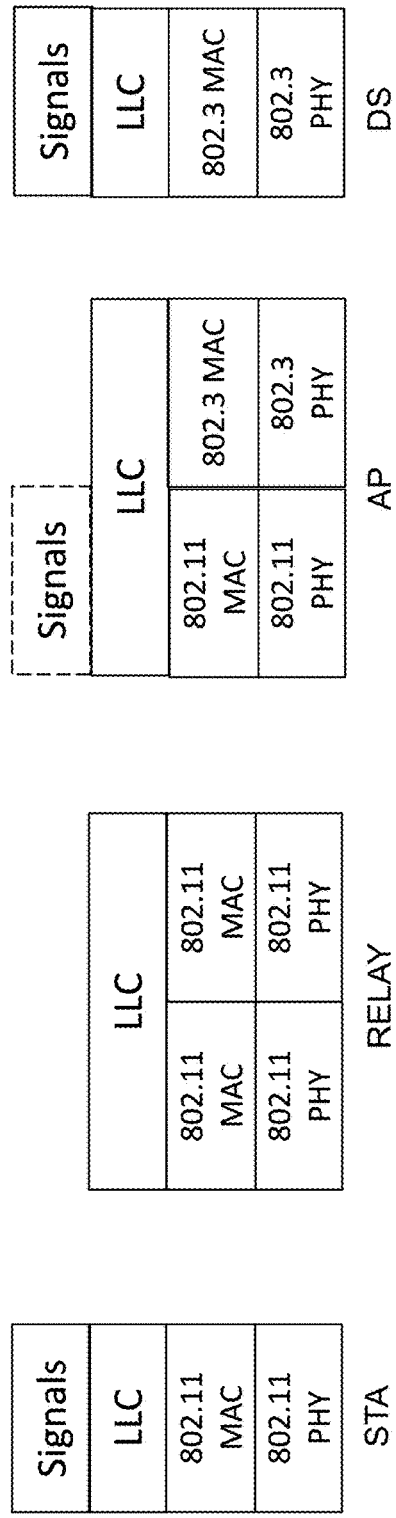
FIG. 6 Relay protocol stack for signaling
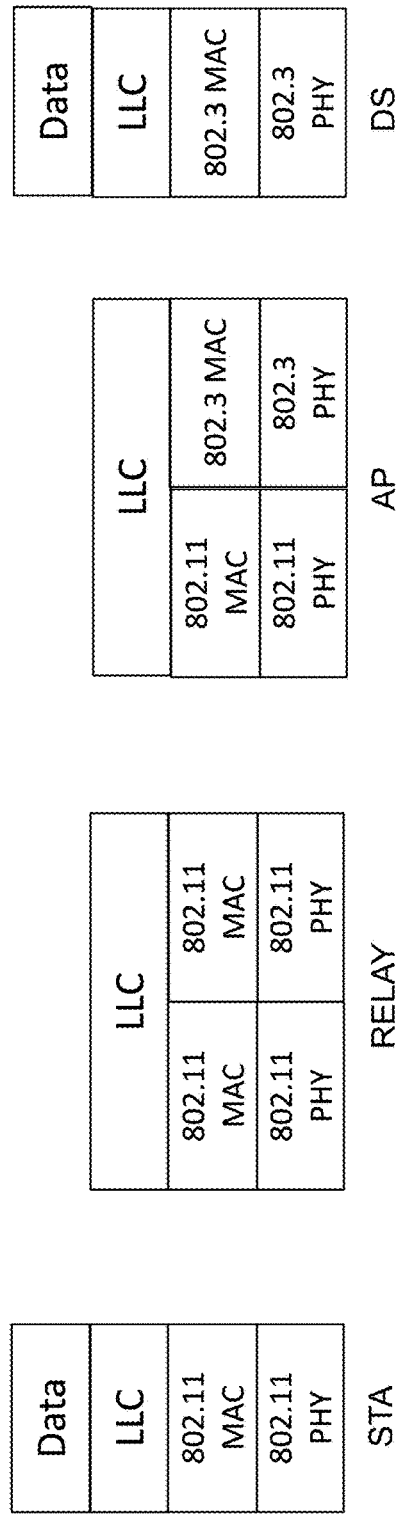
FIG. 7 Relay protocol stack for data

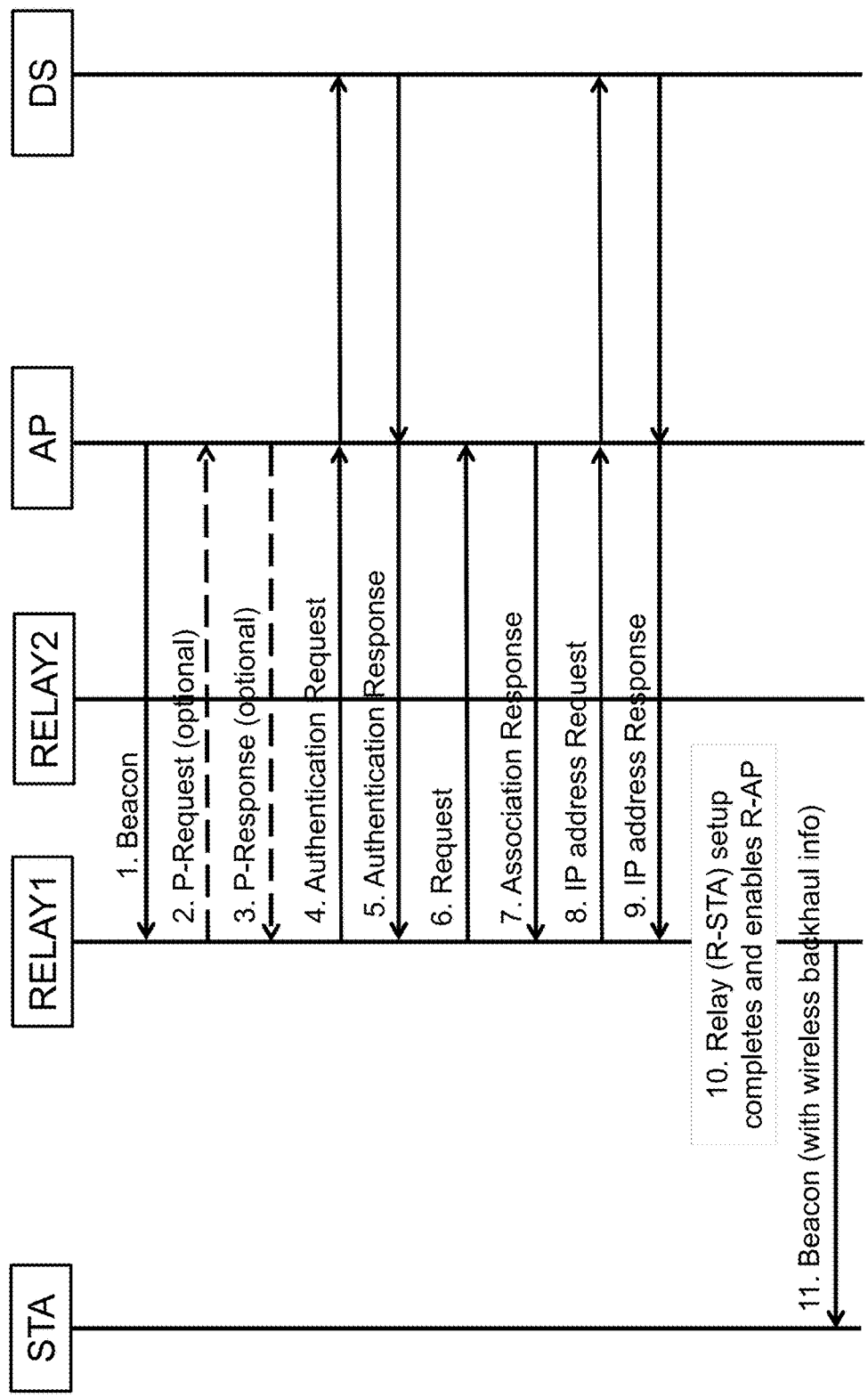
FIG. 8 An example of relay node setup procedure

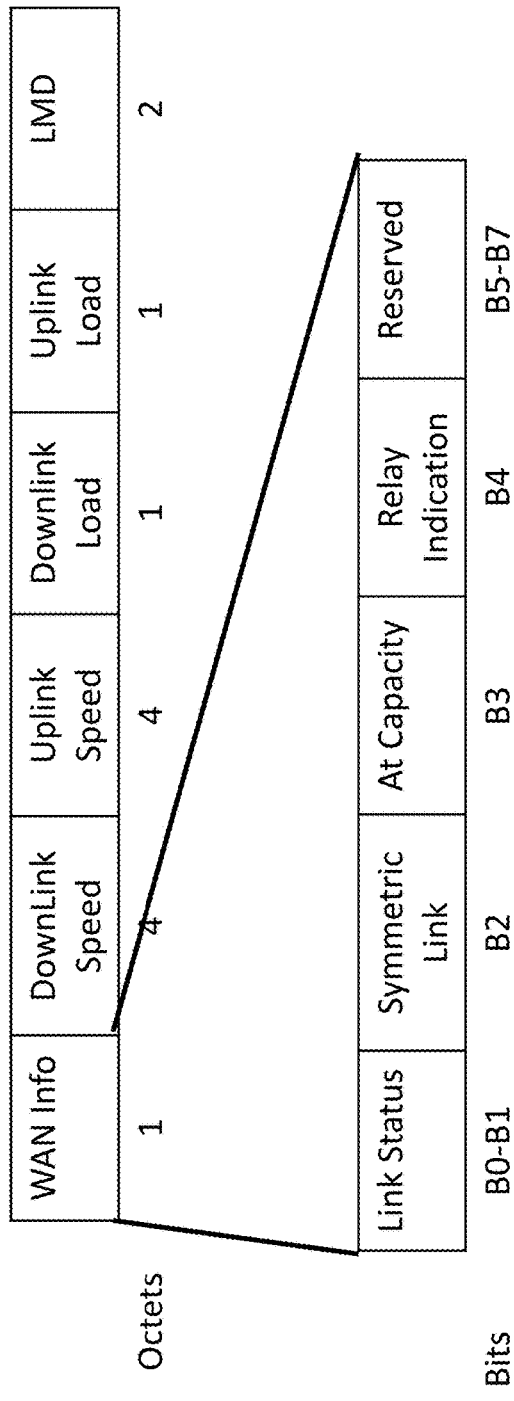
FIG. 9 An example of WAN Metrics for relay

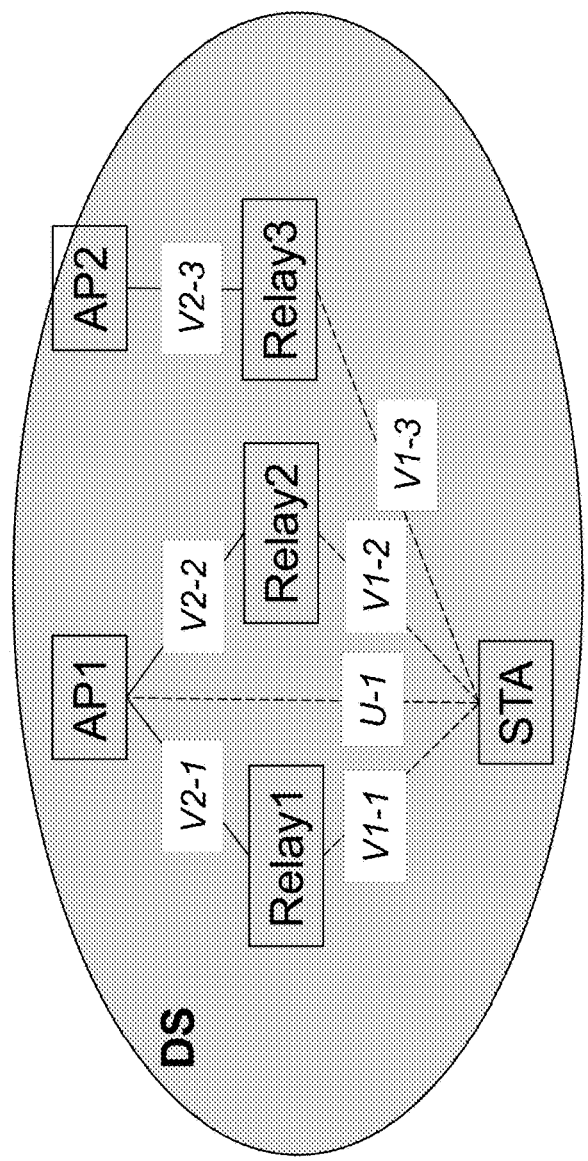
FIG. 10 An example of relay path discovery

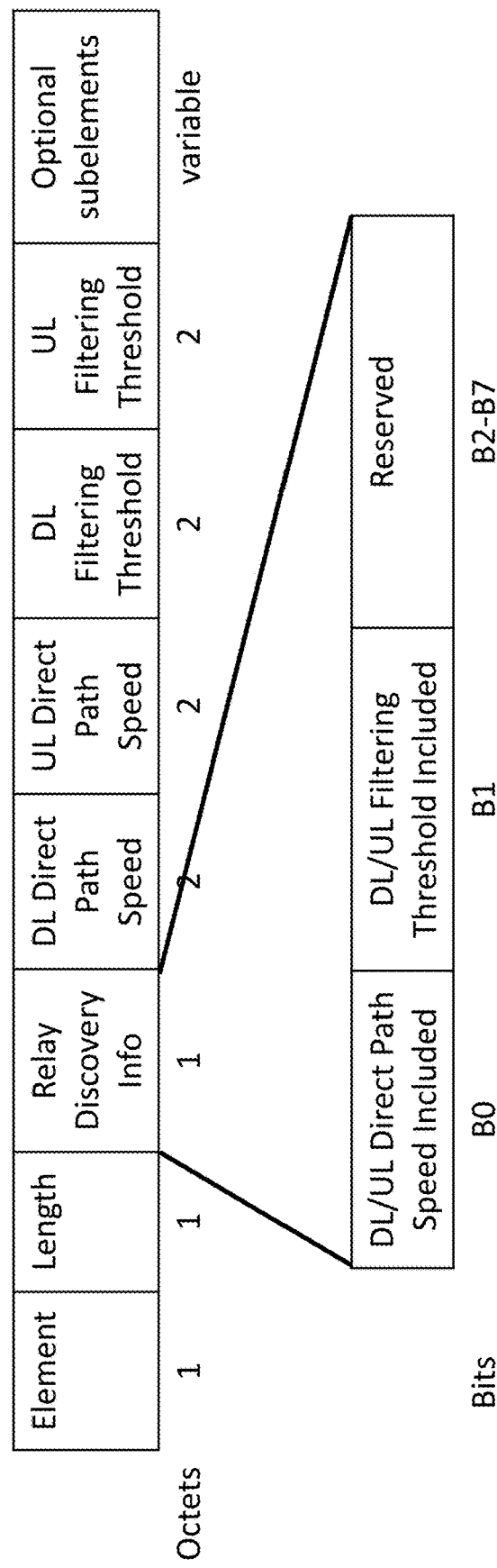
FIG. 11 An example of Relay Discovery IE for Probe Request

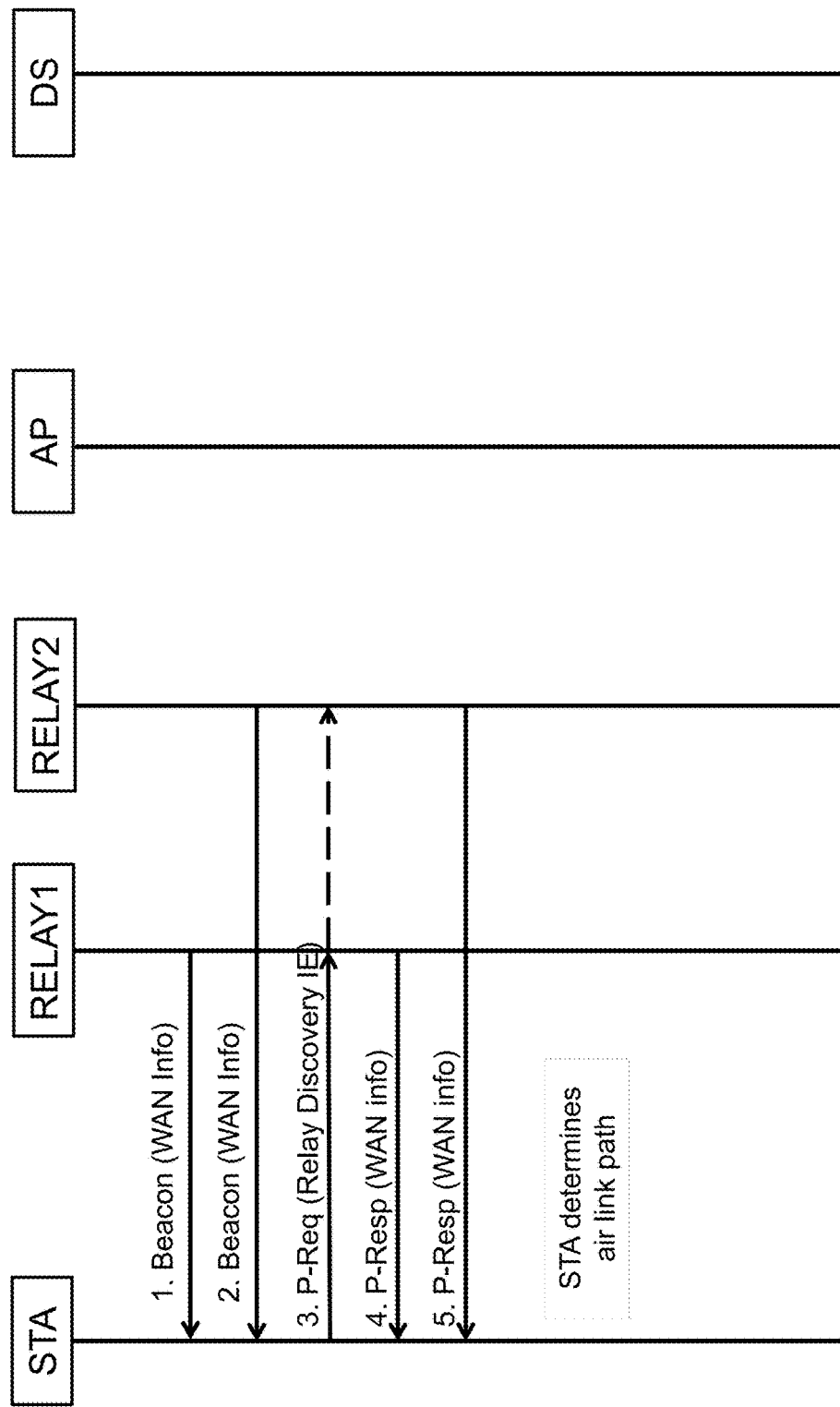
FIG. 12 An example of relay path discovery

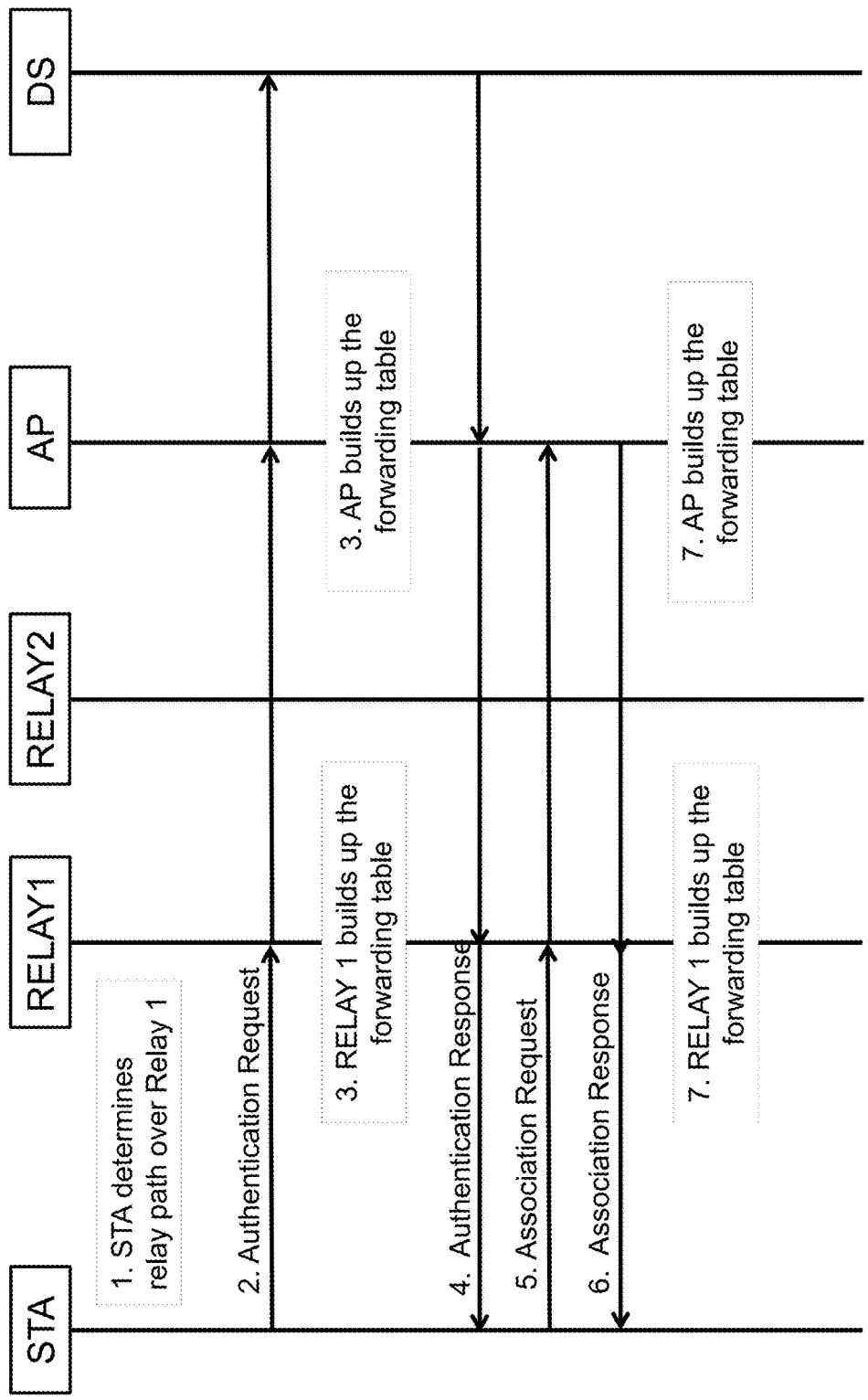
FIG. 13 An example of relay path setup

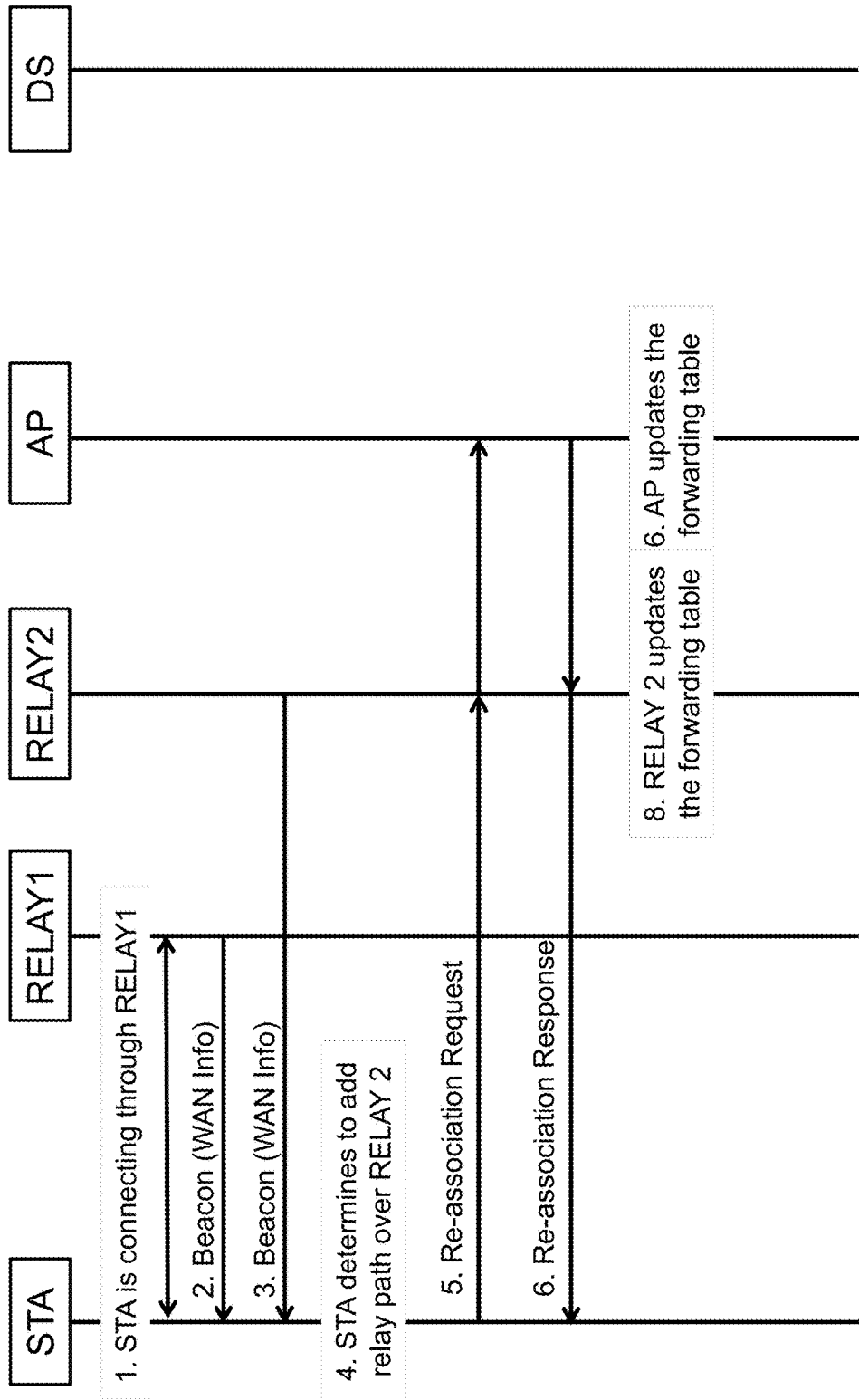
FIG. 14 An example of adding another relay path

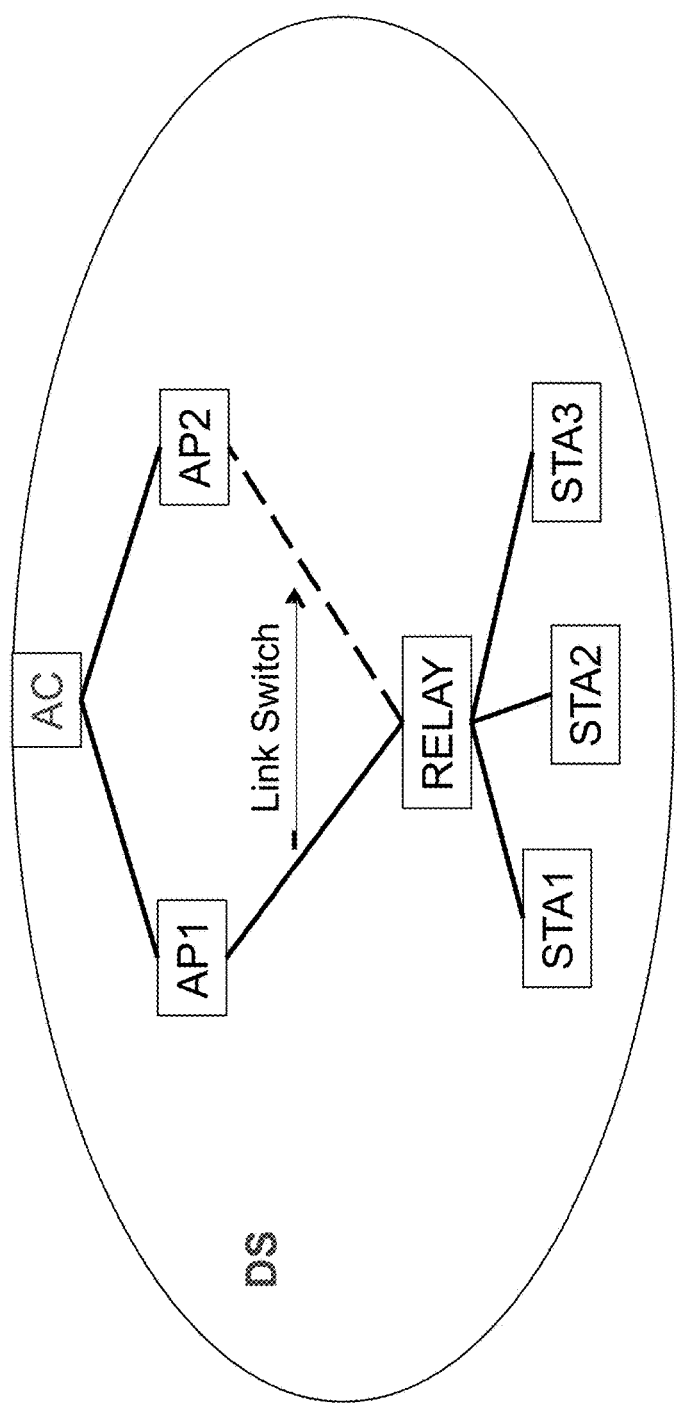
FIG. 15 An example of relay station switching backhaul link

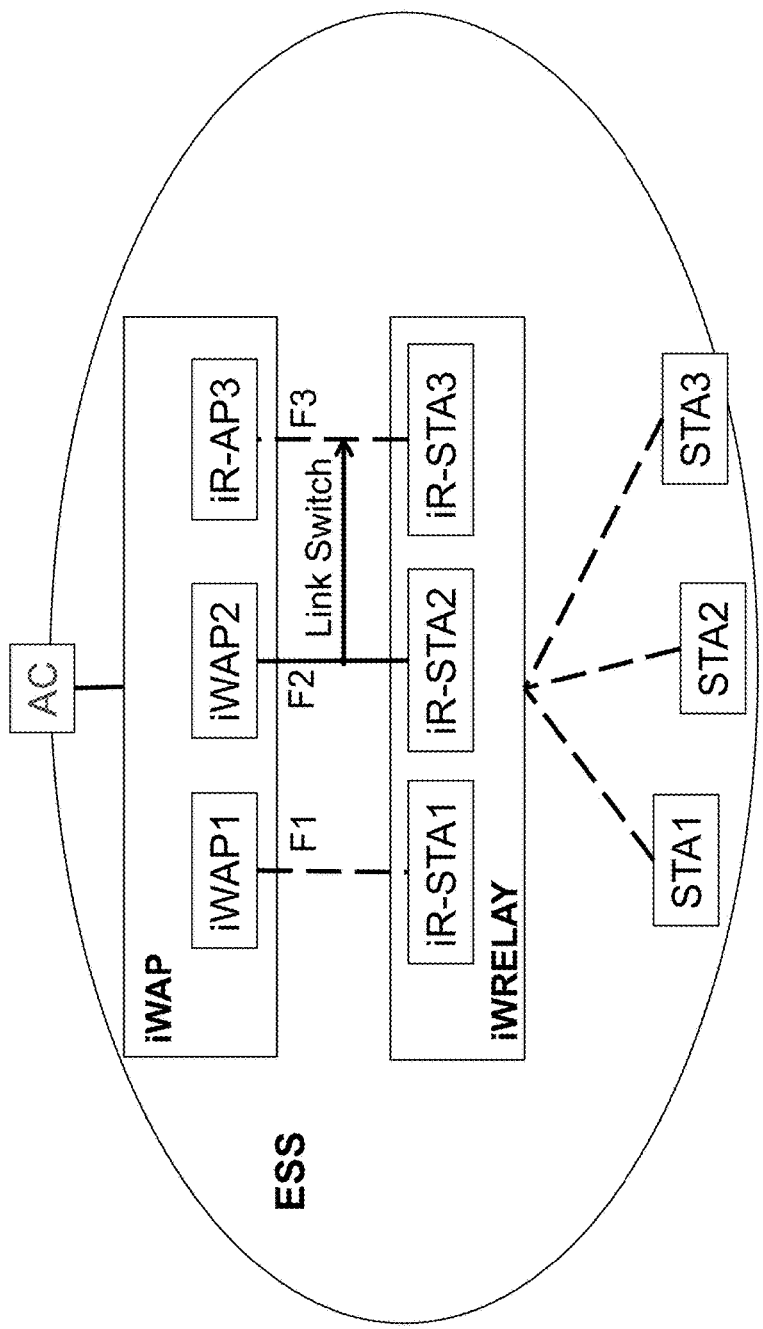
FIG. 16 An example of multiple relay backhaul links to iWAP.

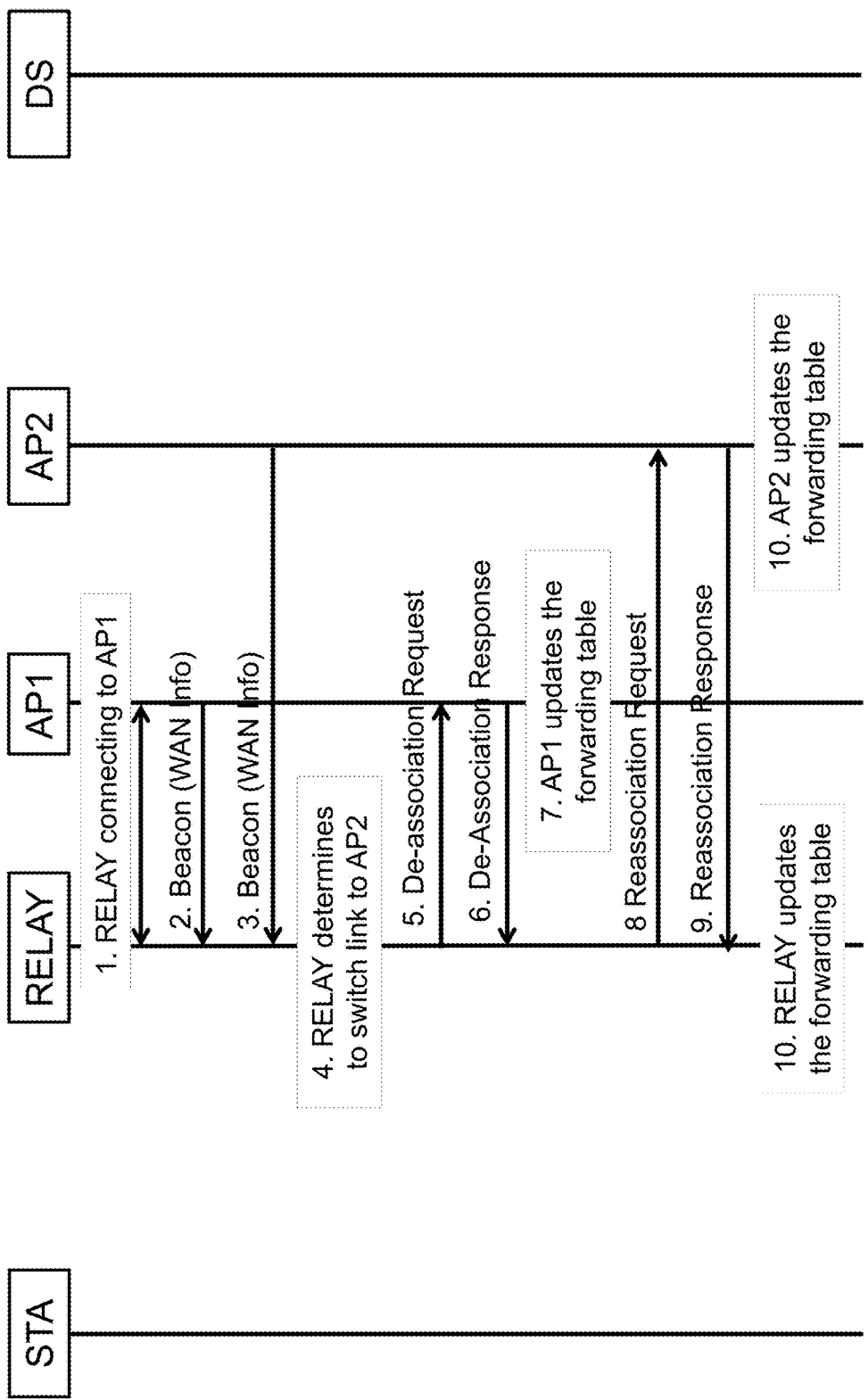
FIG. 17 An example of signal flow for internal wireless backhaul link switching

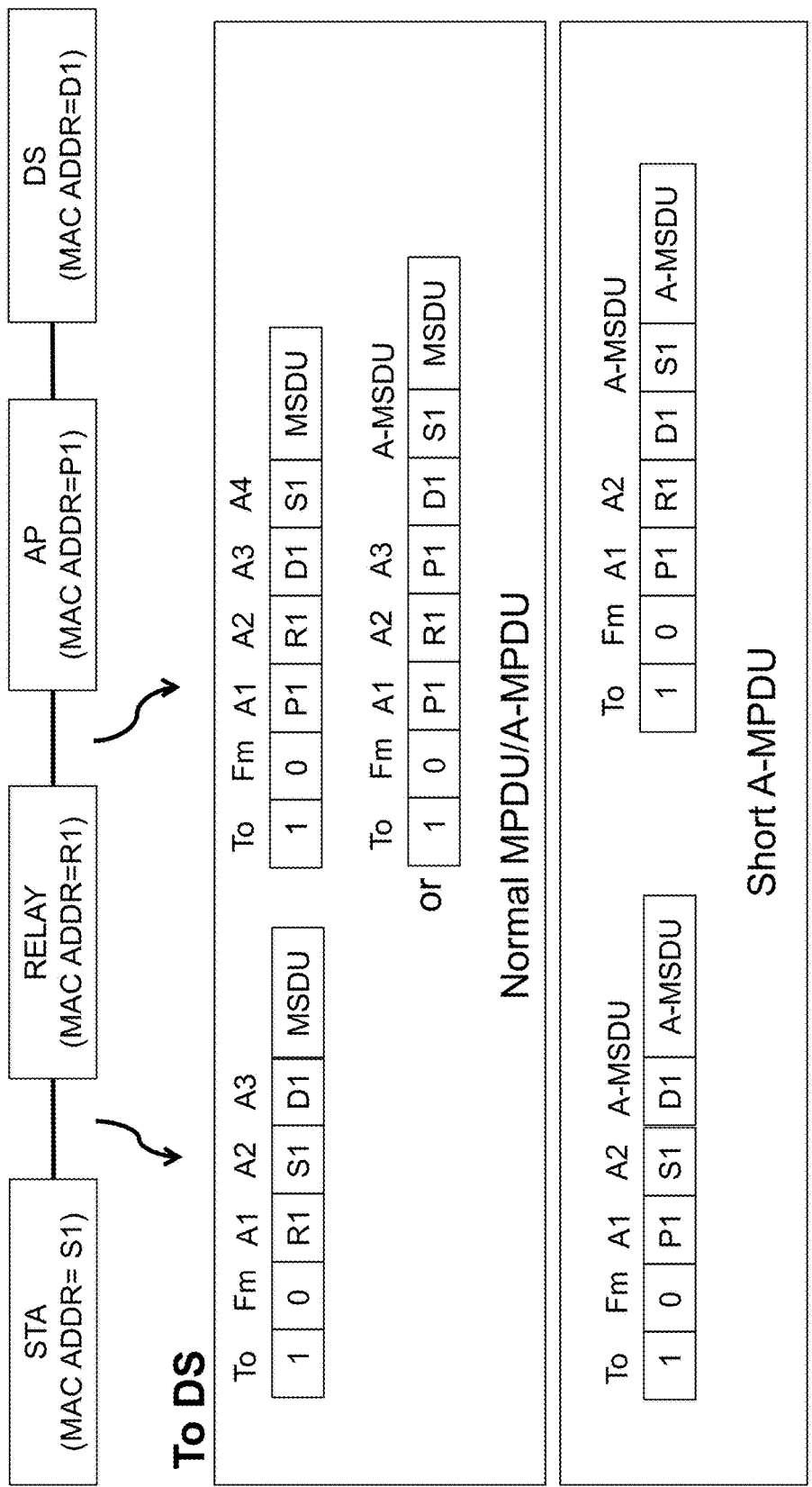
FIG. 18A Address translation in L2 forwarding

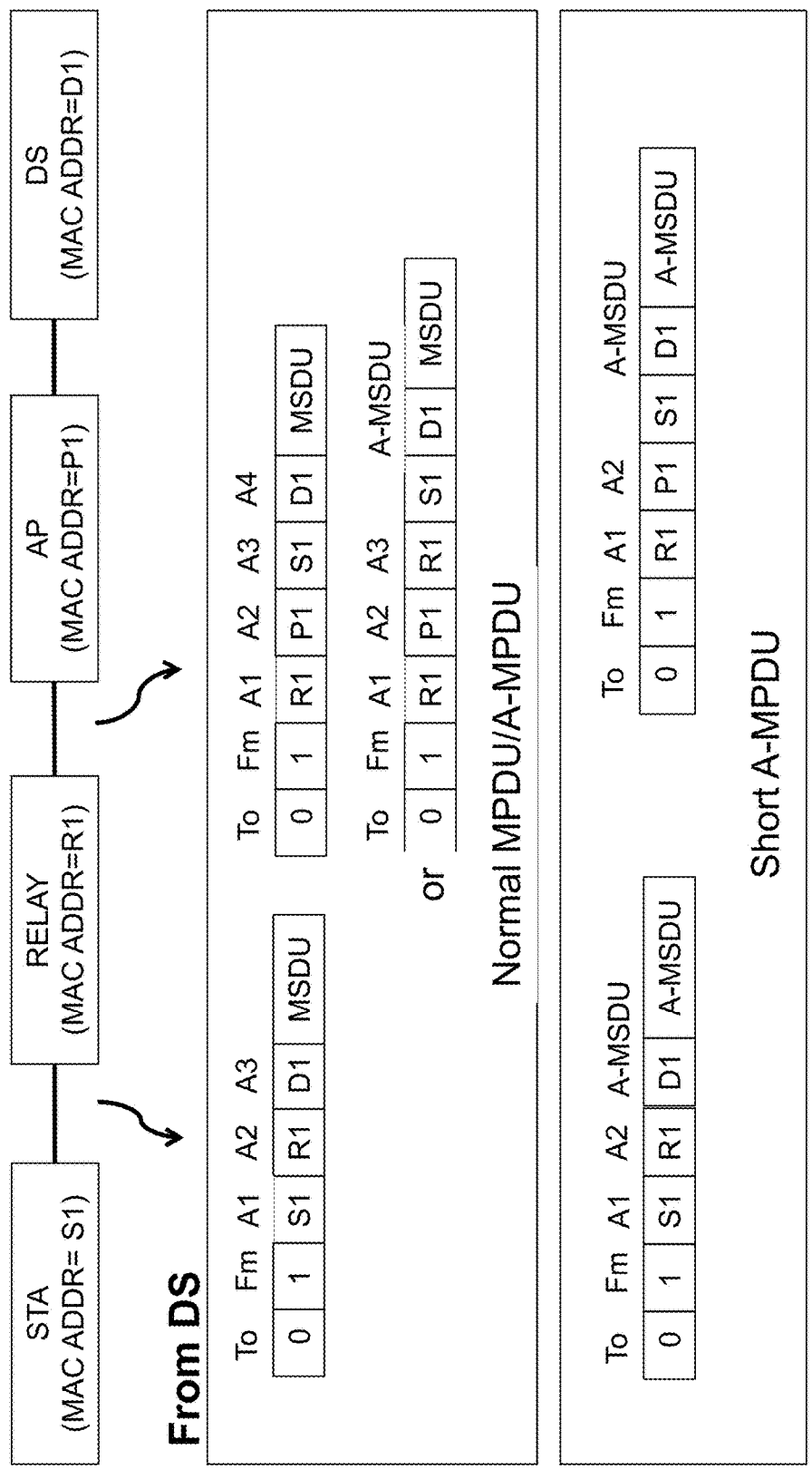
FIG. 18B Address translation in L2 forwarding

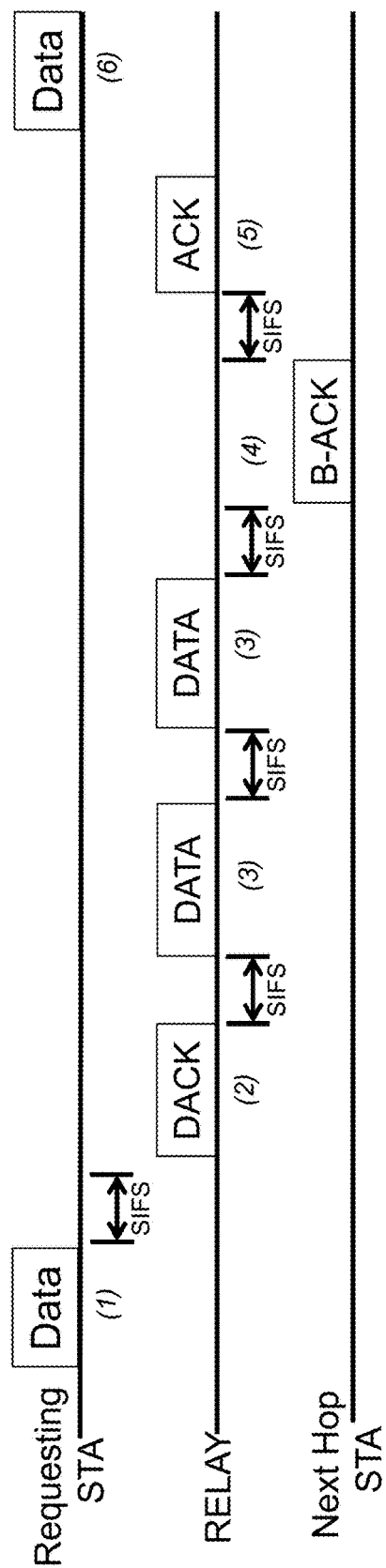
FIG. 19A An example of DACK indication for the final ACK being deferred

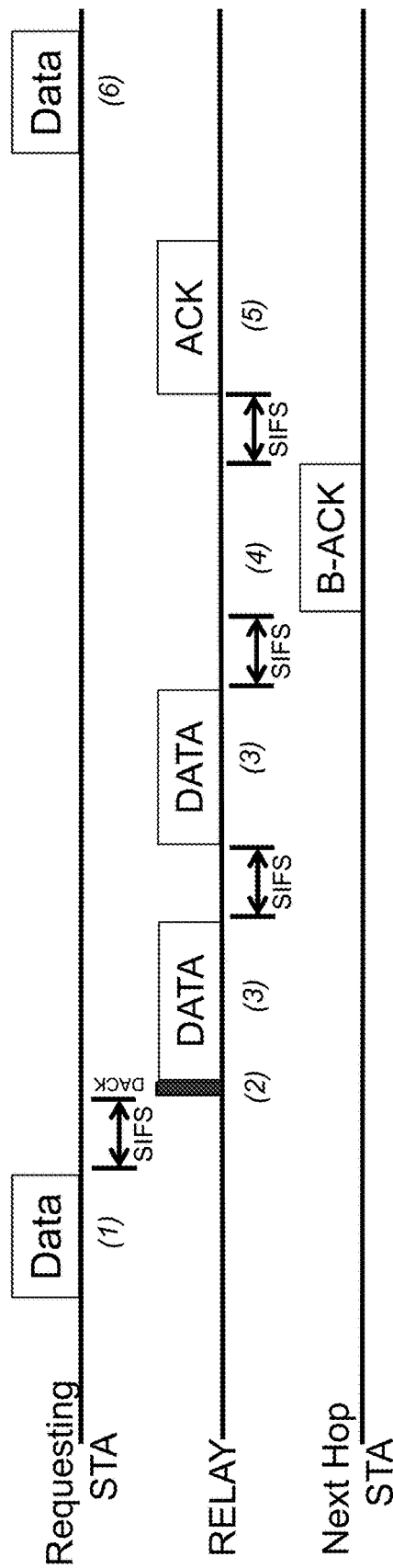
FIG. 19B  An example of DACK indication for the final ACK being deferred

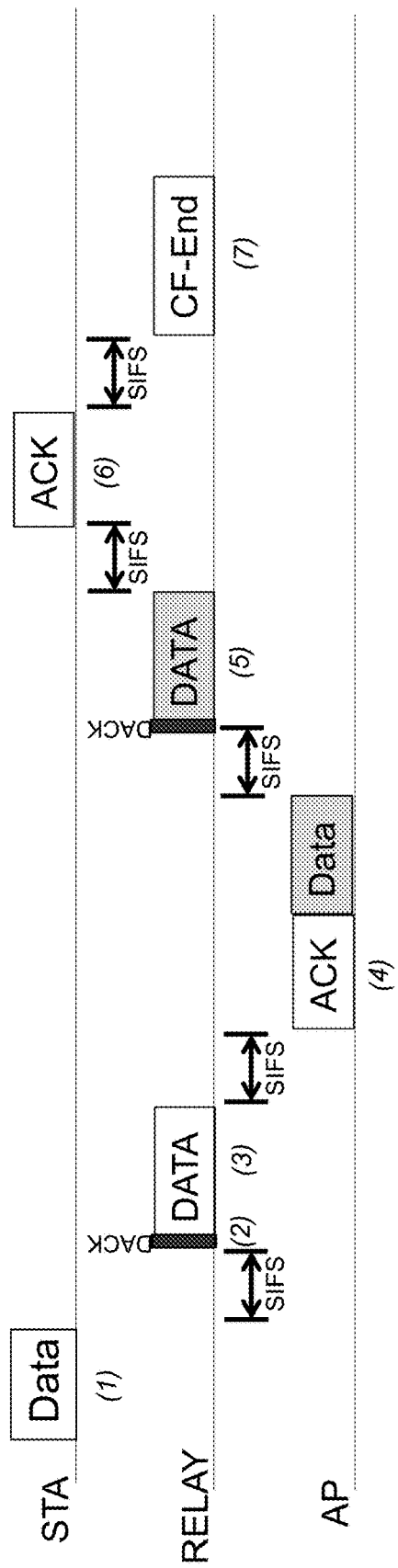
FIG. 19C An example of DACK in two-ways forwarding.

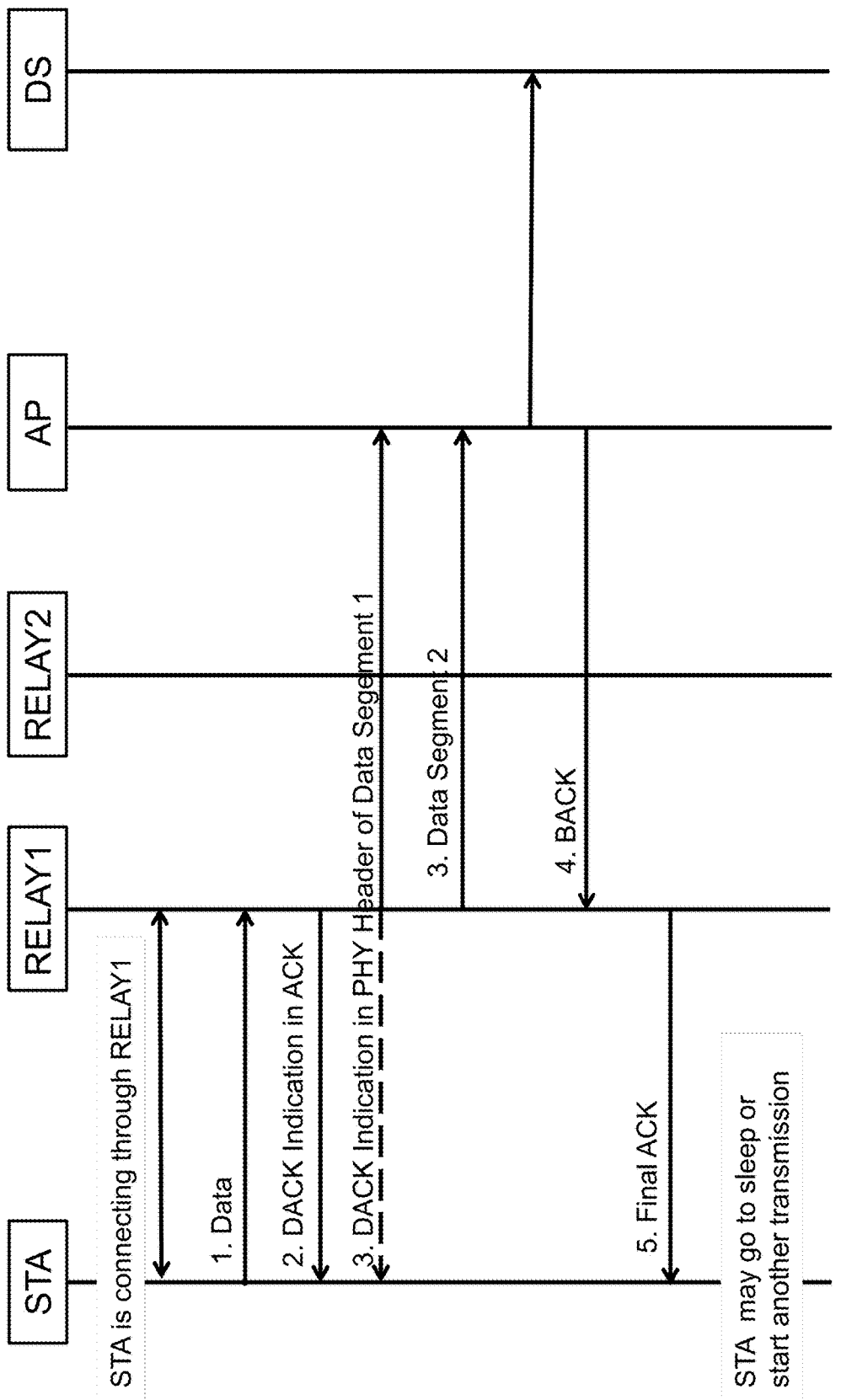
FIG. 20 An example of signal flow for deferred ACK and final ACK sent by relay

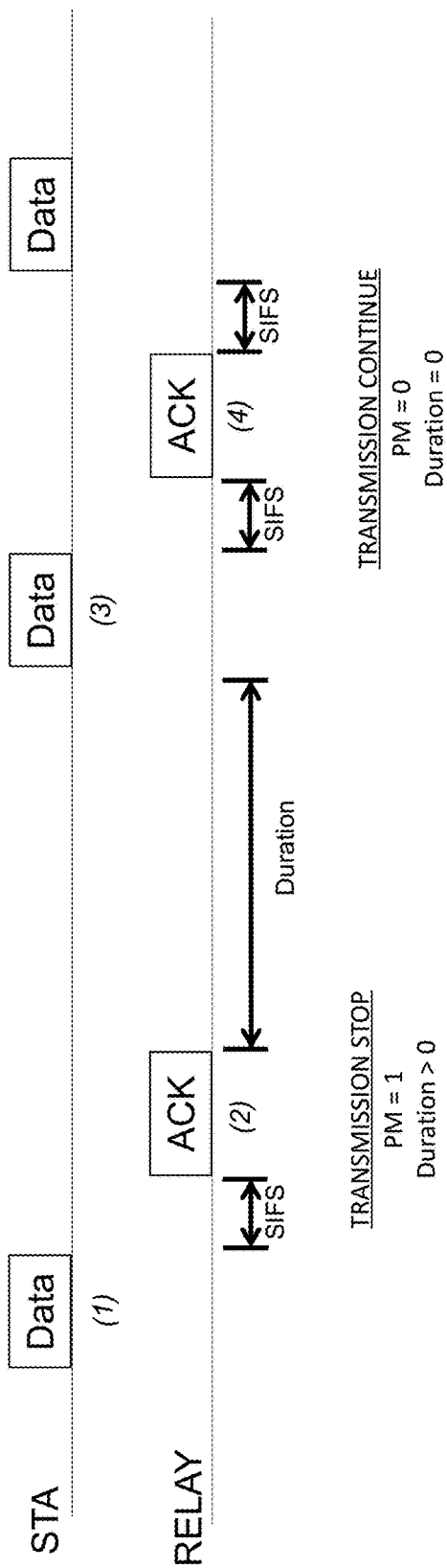
FIG. 21 An example of signal flow for the transmitting STA flow control

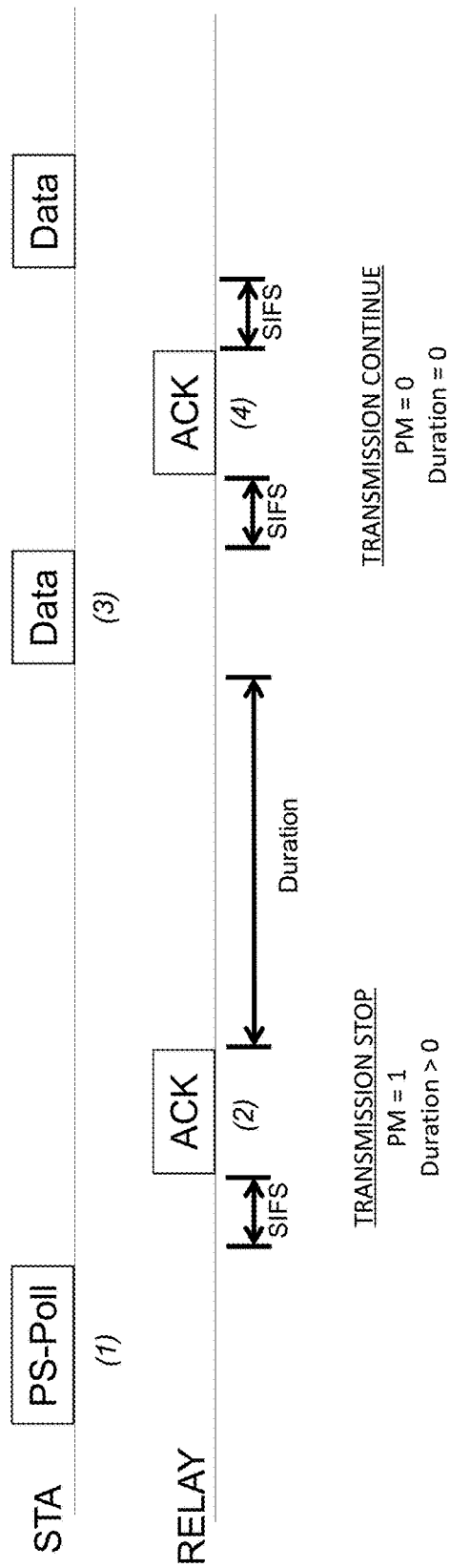
FIG. 22A An example of signal flow for non-TIM STA flow control

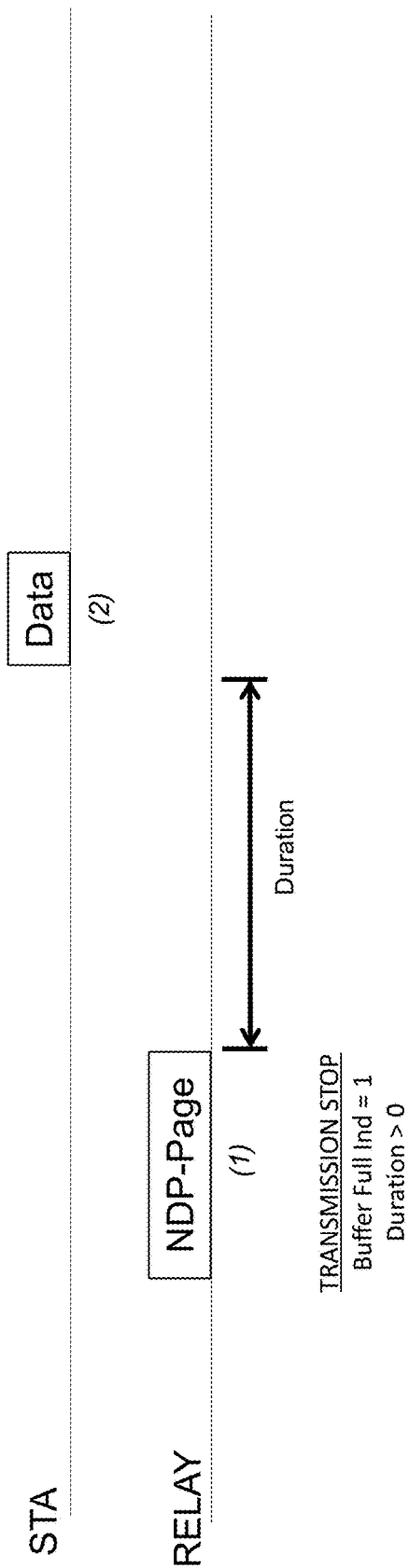
FIG. 22B An example of signal flow for non-TIM STA flow control

INTEGRATED RELAY IN WIRELESS COMMUNICATION NETWORKS

CROSS REFERENCE TO RELATED APPLICATIONS

This patent document claims the benefit of priority of U.S. Provisional Patent Application No. 61/776,670, filed on Mar. 11, 2013. This patent document also claims the benefit of priority under 35 U.S.C. § 119(a) and the Paris Convention of International Patent Application No. PCT/CN2013/075209, filed on May 6, 2013. The entire contents of the before-mentioned patent applications are incorporated by reference herein.

BACKGROUND

This application relates to wireless communications.

With the increased popularity of wireless devices as the user device of choice for accessing the Internet, the bandwidth demand on wireless networks has significantly increased in the last few years. Many wireless devices, e.g., smartphones, e-readers and tablets, often have radio frequency (RF) capability of receiving and transmitting on multiple different wireless networks such as 802.11 local area networks. Therefore, the increased bandwidth demand and extended coverage are felt in places that may be simultaneously served by multiple different wireless networks.

SUMMARY

This document describes architecture, techniques, systems, devices, among the other things, for spectrum sharing in wireless communications. The described techniques, called integrated WiFi relay (iWRELAY) techniques, can be used for facilitating sharing of wireless backhaul connections among multiple wireless access services and improving radio link coverage via simple and reliable wireless backhaul connections.

In one aspect, a method of facilitating wireless communication services between a plurality of wireless stations and an access point is disclosed. The method includes establishing a first wireless communication link with the plurality of wireless stations over a first radio frequency interface, establishing a second wireless communication link with the access point over a second radio frequency interface and operating the second wireless communication link to provide a backhaul connectivity between the plurality of wireless stations and the access point.

In another aspect, a wireless communication system is disclosed. The system includes multiple wireless stations communicating using a first air interface protocol, a relay device and an access point. The multiple wireless stations communicate with entities in a wide area network via the access point without establishing a direct wireless link with the access point. The relay device communicates with the plurality of wireless stations using the first air interface protocol and communicates with the access point using a second, different, wireless communication protocol.

These, and other, aspects are disclosed in greater detail in the present document.

BRIEF DESCRIPTION OF THE DRAWINGS

FIG. 1 shows an example of an infrastructure BSS in a wireless communication system.

FIG. 2 shows an example of WiFi relay topology.

FIG. 3 shows an example of architecture of integrated wifi relay.

FIG. 4 shows an example architecture of an integrated Access Point (iAP).

FIG. 5 shows an example of iWRELAY for in-band relay.

FIG. 6 shows an example of relay protocol stack for signaling.

FIG. 7 shows an example of relay protocol stack for data.

FIG. 8 shows an example of relay setup procedure.

FIG. 9 shows an example of WAN metrics for relay.

FIG. 10 shows an example of relay path discovery.

FIG. 11 shows an example of relay discovery IE for probe request.

FIG. 12 shows an example of relay path discovery.

FIG. 13 shows an example of relay path setup.

FIG. 14 shows an example of relay path switching.

FIG. 15 shows an example of relay station switching backhaul link.

FIG. 16 shows an example of multiple relay backhaul links to iWAP.

FIG. 17 shows an example of signal flow for internal wireless backhaul link switching.

FIG. 18A shows an example of address translation in L2 forwarding to DS

FIG. 18B shows an example of address translation in L2 forwarding from DS

FIG. 19A shows an example of DACK indication for the final ACK being deferred.

FIG. 19B shows an example of DACK indication for the final ACK being deferred.

FIG. 19C shows an example of deferred ACK in two-ways forwarding.

FIG. 20 shows an example of signal flow for deferred ACK indication and final ACK sent by relay.

FIG. 21 shows an example of signal flow for active transmitting station's flow control.

FIG. 22A shows an example of signal flow for the non-TIM station flow control

FIG. 22B shows an example of signal flow for the non-TIM station flow control via NDP-Page frame

DETAILED DESCRIPTION

This document describes the architecture, techniques, mechanisms, systems and devices of integrated WiFi Relay (iWRELAY) in the integrated WLAN (iWLAN) of wireless communication systems.

Wireless communication systems can include a network of one or more access points (AP) that are configured to communicate with one or more wireless stations (STA). An access point can emit radio signals that carry management information, control information or users' data to one or more wireless stations. The STA can also transmit radio signals to the AP in the same frequency channel via time division duplexing (TDD) or in different frequency via frequency division duplexing (FDD).

For the ease of the subsequent description, wireless communication networks can be categorized as i. wireless wide area network (WWAN)—these networks typically extend over several tens or hundreds of miles, and can span across an entire country/continent.

ii. wireless local area network (WLAN)—these networks may be located in a physical proximity of a building or a home or a campus. The reach of WLAN may be in the range of tens of meters to a few miles (e.g., 5 to 10 miles).

iii. wireless personal area network (WPAN)—the signal range in WPAN may be limited to a close proximity of a transmitter, e.g., 1 to 20 feet.

WWAN may be a type of cellular networks such as using Code division Multiple Access (CDMA) or other wireless technologies. A traditional cellular network is built for voice services and evolves to offer circuit and packet data services. The cellular network is coverage orientated and has to provide enough wide coverage so that the voice and data services can be used by subscribers in major areas.

As smartphones and other portable devices like iPads, notebooks, netbooks are widely used by a lot of people, mobile data traffic increases dramatically in cellular networks over last several years. In some market, a few percent smart phones consume a large percent of total data traffic of cellular network. This data traffic continues growing as many internet applications are developed and used by those devices, which is causing cellular network congestion especially in hotspot areas (i.e., high density of users).

Although 4G evolved Universal Mobile Telecommunications System (UMTS) Terrestrial Radio Access (E-UTRA) cellular network is being deployed nationwide in some countries, it may still not meet the mobile data traffic demanding. In some high density hotspots, like airports, shopping malls, data throughput over 4G cellular network might be below the expectation. As more people are relying on mobile devices to access various applications in the Internet, it continues creating a huge data capacity demanding on cellular networks, which is changing traditional wireless network investments from coverage to capacity in next generation of wireless networks.

New wireless service providers such as existing cable TV operators, or fixed access operators or other Internet service providers would like to extend their existing services to wireless access for enterprise wireless or public wide area wireless services such as free airport wireless access for convenience to transit passengers, public transportation information broadcasting, connecting to government's devices such as curbside parking meters, monitoring systems, emergency response etc. These service providers could either acquire some spectrum from government authority or use license exempt spectrum to operate wireless services. The latter might be more attractive especially for hotspot like coverage.

A WLAN, on the other hand, typically links two or more stations in the small radio coverage area and provides a connection to the Internet through an access point. An access point and a wireless station can communicate based on specification of IEEE 802.11.

IEEE 802.11 is an asynchronized time division duplexing technology designated for WLAN. The basic unit of WLAN is a basic service set (BSS). In a BSS, both access point and stations share the same frequency channel and use CSMA/CA, a kind of TDD mechanism, for data transmission.

In IEEE 802.11, wireless stations (also called stations, e.g., STA11, STA12, STA 13, STA21, STA22 in FIG. 1) associated in the radio coverage area establish a BSS and provide basic service of WLAN.

A central station associated by other stations and dedicated to manage the BSS is referred to as an Access Point (AP). A BSS built around an AP is called an infrastructure BSS. FIG. 1 illustrates an example of infrastructure BSS. BSS1 and BSS2 are two infrastructure BSSes formed by two APs. BSS1 contains one access point (AP1) and several non-AP stations, STA11, STA12, and STA13. The AP1 maintains associations with stations STA11, STA12, and STA13. BSS2 contains one access point (AP2) and two non-AP stations, STA21 and STA22. The AP2 maintains associations with stations STA21 and STA22. Infrastructure BSS1 and BSS2 may be interconnected through backhaul of AP1 and AP2 or connected to a server through a distribution system (DS).

A wireless relay is a building block of a wireless mesh network, which support a tree topologic. The four-tuple addresses defined in 802.11 supports data forwarding mechanism in the relay networking Due to much wider spectrum than other wireless technologies, wireless relays are easier to be adopted in WLAN networks.

FIG. 2 shows an example of WiFi relay topology. A WiFi relay consists of one wireless link to its parent node, and one or more wireless links to its children nodes. The top node in the tree-structured networking is the AP. The leaf nodes in the tree-structured networking are stations.

A WiFi relay can be considered as a function entity including a Relay AP (R-AP) function plus a Relay Station (R-STA) function. Therefore a relay can be viewed as an AP with a wireless backhaul. The R-AP and R-STA are functional entities and can be connected through the interconnection link either wired or wirelessly.

An integrated WiFi relay (iWRELAY) is an integrated relay station with multiple R-APs and R-STAs, each of which can operate on its own frequency channel.

FIG. 3 shows an example of an integrated WiFi relay radio transceiver station. An iWRELAY can include one or more individual communication interfaces for transmitting and receiving data over the radio links, such as three individual IEEE 802.11 access points (R-AP) and station (R-STA) in the example. Those individual R-APs and R-STAs are integrated into single integrated radio station iWRELAY and share the common electronics such as antenna (array), general processor, memory. R-STAs can provide shared wireless backhaul links for R-APs. Each R-AP and R-STA of the integrated radio station iWRELAY can operate on its own TRX, PHY and MAC independently.

The R-AP of iWRELAY can include one or more transceiver electronics to send and/or receive wireless signals over one or more communication interfaces such as one or more antennas to its children stations. The R-STA of iWRELAY can include one or more transceiver electronics to send and/or receive wireless signals over one or more communication interfaces such as one or more antennas to its parent station(s). Each transceiver electronic can be operated in its own frequency channel.

An iWRELAY can include processor electronics such as a microprocessor that implements methods such as IEEE802.11 MAC and one or more of the techniques presented in this document. The processor electronics in R-AP and R-STA can be interconnected through an internal link or externally connection. An iWRELAY station can include one or more memories configured to store information such as data and/or instructions.

A relay station can operate on in-band forwarding, i.e. the frequency channel of wireless links to its parent station (i.e. iWRELAY to AP) and to its children station (i.e. iWRELAY to STA) are the same. Due to operating on the same frequency, the in-band relay station can share many components between R-AP and R-STA to reduce the cost. The in-band relay can be used to improve radio coverage. FIG. 4 illustrates an example of iWRELAY for in-band forwarding.

A relay station can also operate on out-band forwarding, i.e. the frequency channel of wireless backhaul links to its parent station (i.e. iWRELAY to AP) and to its children stations (i.e. iWRELAY to STA) are different. The out-band relay provides more flexibility comparing to the in-band relay. In addition to extend the radio link coverage, the out-band relay may also be used to reduce the congestion on 2.4 GHz frequency band via operating relay (R-AP) on 2.4 GHz and operating AP on 5 GHz band.

FIG. 5 illustrates an example of iWRELAY for the out-band forwarding.

FIG. 6 shows an example of signaling protocol stack used by wireless relay.

FIG. 7 shows an example of data protocol stack use by wireless relay.

A wireless relay node has to setup its backhaul connection or associate with its parent node before it can provide forwarding function to its child stations.

FIG. 8 illustrates an example of relay node setup procedure with its parent node. From the top of the drawing to the bottom of the drawing the following signal exchanges may be performed.

1. The parent node (AP) may periodically broadcast the system parameters or network information in the beacon frame.
2. After power-up, the relay node (R-STA) may optionally send a Probe Request to the parent station(s) to query the information about the parent node.
3. After receiving the Probe Request frame, the parent nodes (AP) may respond with the necessary information in the Probe Response frame for the relay node to associate with.
4. According to the response information, the relay node (R-STA) may send an Authentication Request to the parent node (AP) to start the authentication process with the DS. AP may forwards this Authentication Request to the DS.
5. After the receiving the Authentication Request from the AP, the DS sends an Authentication Response to the AP. AP then forwards it to the relay node.
6. If the authentication passes, the relay (R-STA) will initiate the association procedure via sending an Association Request to the AP to setup the wireless backhaul connection with the AP.
7. The parent node (AP) responds back with the Association Response frame to confirm the link setup.
8. After successfully associating with AP, the relay node sends a request to DS to allocate an IP address for itself.
9. The DHCP in DS will allocate an IP address and assign to the relay node.
10. After that, the relay node can power up its R-AP to start transmission of beacon signal to its children station periodically.

The relay node may need to provide some additional information about itself and the relay path information on V2 link. From a station point of view, a relay node is just to use wireless backhaul for data forwarding, while a normal AP uses wired connection for transmission. Therefore the path (V2) of relay can be considered as a wireless backhaul comparing to the normal wired backhaul of AP. Additional information about wireless backhaul could be included in the existing WAN metrics information element or in a new defined information element. Therefore the station would treat a relay and AP in the same way in the radio link selection.

FIG. 9 shows an example of modified WAN metrics information to support the backhaul link for relay. The relay node (R-AP) converts the wireless backhaul link condition and/or QoS information such as RSSI, best MSC, latency, priority and average loading into the DL/UP Speed and DL/UP Load of WAN Metrics and broadcasts them to indicate the link condition of relay path between R-STA and AP. The relay node may indicate its wireless backhaul link in the "Relay Indication" of the WAN Metrics so that stations could determine whether to associate through the relay node or not.

In WLAN deployment case, there might be multiple relay nodes in a DS. FIG. 10 shows an example of DS which includes two APs (AP1 and AP2), three relay nodes (Relay1, Relay2 and Relay3), and one station STA. After wireless backhaul link established with APs, each relay node, Relay1, Relay2 or Relay3 operates independently to provide data forwarding. When the station is powered up, it needs to find a proper wireless link to the DS.

An STA could either listen to beacon frames broadcast from AP1, AP2, Relay1, Relay2 or Relay3 to get the backhaul ink condition of those nodes, or uses the active scan procedure via sending a Probe Request to backhaul link condition information. When AP or relay nodes (R-AP) receive the Probe Request frame, it could send a Probe Response frame including the backhaul link information in the WAN Metrics.

In the case shown in FIG. 10, it might be possible that many stations (APs or relays) respond the Probe Request frame. In order to reduce the number of responses, the requesting station may include the throughput information of the direct path U1, if it has, in the Probe Request frame optionally which provides some information for the relay nodes or AP to determine whether or not to respond the Probe Request frame via comparing U1 throughput with their backhaul capacities.

FIG. 11 shows an example of Relay Discovery IE optionally included Probe Request to assist relay node to make a decision.

The Relay Discovery Info Field contains DL Direct Path Speed Field and UL Direct Path Speed Field to provide the DL and UL throughputs measured by the station over the direct path to an AP, in the step of 100 Kbps, and DL Filtering Threshold Field and UL Filtering Threshold Fields for the relay node to determine whether or not respond to the Probe Request. If the filtering criteria is not included in the Relay Discovery IE, the relay node may use the default filtering value and direct path throughput information to determine whether to respond or not.

FIG. 12 shows an example of relay path discovery using the information from Beacon or Probe Response frame.

1. There are two relay nodes in the WLAN network, RELAY1 and RELAY2. After initialization, and associated with the AP, the relay node 1 operates normally and broadcasts beacon frames periodically. Relay node 1 provides the relay link condition in the WAN information of the beacon frame. Each relay node will include its own BSSID information in the MAC header and share the same SSID with other relay or AP. Therefore from the station point of view, there is no much difference to associate through regular AP or relay station.
2. Similarly, the relay node 2 transmits its relay link condition in the WAN information of its beacon frame. Relay node 2 will set its own BSSID information in the MAC header and share the same SSID with other relays or APs.
3. If a station does not receive beacon frame with WAN information, it may send a Probe Request frame with the relay discovery IE which provides the direct link channel condition and some filtering criteria for responding relay nodes to make decision.
4. If the relay node 1 receives the Probe Request with Relay Discovery IE, it can determine whether it needs to respond the Probe Request. If the relay node finds its relay link throughput is less than the direct link throughout by the given criteria, the relay node may not send a Probe Response. Otherwise, it will send a Probe Response to the requesting station.

5. Similarly, the relay node 2 makes the decision whether or not to respond the received Probe Request based on the direct link throughout and filtering criteria. If met, it will send a Probe Response to the requesting station.

FIG. 13 shows an example of relay path setup according to the result of relay path discovery. During the relay path setup, the relay node and AP builds up the forwarding address translation table for the future data or management frames forwarding.

1. After getting information of relay paths from different relay nodes, the station determines to associate with AP through the relay node 1.

2. A station sends the Authentication Request frame to the relay node which it would like to associate with, Once the relay node receives the Authentication Request, it forwards it the next hop station (i.e. AP) over the relay link by reconstructing MAC address (See FIG. 18A and FIG. 18B), i.e. setting RA=BSSID of AP, TA=MAC address of relay, DA=MAC address of the authentication server, and SA=MAC address of the station. AP then forwards the Authentication Request to the authentication server.

3. Meanwhile, the relay node and AP build up the forwarding MAC address translation table.

4. After receiving the Authentication Response, the AP sets the address fields of MPDU RA=MAC address of relay, TA=BSSID of AP, DA=MAC address of the station, and SA=MAC address of DS, and send to the relay node. The relay node then forward the received Authentication Response to the station via reconstructing the MAC address, RA=MAC address of station, TA=BSSID of relay, and SA=MAC address of DS.

5. After success of authentication, the station sends an Association Request to the relay node. The relay node then sets the MAC address field of MPDU RA=BSSID of AP, TA=MAC address of relay, DA=BSSID of AP and SA=MAC address of station; and forward it to AP.

6. Once the AP receives the Association Request, it sends an Association Response to the relay node with RA=MAC address of relay, TA=MAC address of AP, DA=MAC address of the station and SA=MAC address of AP. The relay node then forwards the received MPDU to the requesting station.

7. If the AP assigns AID to the station in the Association Response, the relay and AP update the forwarding address translation table accordingly. From the station point of view, it virtually associates with the relay and transmits any packet through the relay. When a packet addressed to DS, the relay and AP forward the received data or management frames to the DS according the forwarding address translation table. When a packet received from DS, AP or relay forwards the data packet to the station using the same forwarding address translation table.

After the relay path setup, the station may move to other location or the radio link condition between the station and the relay node may change, therefore the station may need to switch to or add another relay node.

FIG. 14 shows an example of the station adding a relay path over other relay node. In the current 802.11 infrastructure BSS, a station can only associate with one AP. If the station would like to change the association, it has to send a Re-association Request frame to a new AP and De-associate with old AP. In the relay case, the association is done with AP through a relay node. Therefore when the station switches to a new relay node, it is not necessary to disconnect with old relay node if the new relay node is connecting to the same AP as the old relay node. In other word, the integrated relay mechanism supports the association with an AP through multiple relay nodes simultaneously. In this way, the station could be able to dynamically select the best radio link for transmission among the multiple relay paths.

1. Assuming that the station is connecting to AP through relay node 1.

2. Relay node 1 periodically sends beacon frame including its relay link information.

3. Relay node 2 sends beacon frame including its relay link information periodically.

4. According to the received relay link information of Relay 1 and Relay 2, the station detects the Relay 2 has a better relay link throughput and would like to switch the association to Relay 2.

5. The station sends a Re-association Request to the Relay 2. Relay 2 reconstructs the MPDU with new MAC addresses and forwards to AP.

6. AP sends the Re-association Response to the Relay 2. The Relay 2 then rebuilt the MPDU with new MAC addresses and forwards it to the station.

7. Relay 2 and AP update their forwarding address translation tables.

After adding another relay path, the station could be able to dynamically adapt to the relay path condition change, and select best relay path for the transmission. In the dynamical relay path selection, the station controls the relay path selection. The station may periodically monitor the beacon frames from different relay nodes in the coverage and update the relay path status list. If the station needs to send a data to the DS, it can choose the best relay path from the relay path status list for the uplink transmission. On AP side, the relay path status records the latest relay path used for communication with the station, If the AP needs to send a data to the station, AP may use the latest the relay path which was communicating though with the station. In this way, it will fast adapt link condition and significantly reduce the link setup time during the relay path switching.

In addition to the relay path (V1) change, the relay backhaul link condition may change as well. If the original relay backhaul link is not the best link to DS, the relay node may switch its backhaul link via another AP to the DS.

FIG. 15 shows an example of relay node to switch its backhaul link. The relay node is connected to AP1. After detecting the radio link change, the relay node decides to switch the backhaul link to AP2. The backhaul link switching should be transparent to stations.

When iWRELAY is connecting to an iWAP through one wireless backhaul links operating on a frequency channel, the iWRELAY may switch its backhaul link internally to different link if the current backhaul link condition is not very good. In addition, iWRELAY and iWAP can be connected through multiple wireless backhaul links in parallel, each link is operating on different channels. Therefore the relay node (iWRELAY) would adapt the radio condition variance to provide more reliable wireless backhaul connection.

FIG. 16 shows an example of multiple wireless backhaul links of a relay node connecting to an iWAP to provide internal backhaul link switching function and/or operate in parallel for reliable wireless backhaul connection.

FIG. 17 shows an example of signal flow for internal wireless backhaul link switching.

1. The relay node is connecting to AP1.
2. AP1 periodically broadcasts the relay link information in the beacon frames
3. Similarly, the neighboring AP2 also transmits its relay link information in the beacon frames.
4. After receiving relay link information of connecting to different neighboring APs, the relay node may decide to change the backhaul connection (relay link) to AP2.
5. The relay node sends a De-association Request to the AP1.
6. The AP1 responds with a De-association Response to indicate the connection to the relay is removed.
7. AP1 updates its forwarding address translation table accordingly.
8. The relay node sends a Re-association Request to AP2 to request the link setup.
9. The AP2 sends a Re-association Response to allow the connection setup.
10. Both relay node and AP2 update their forwarding address translation tables accordingly.

A relay can perform a layer 2 forwarding function for control frame, management frames and data frame between AP and STA. A relay node could use the existing 3-tuple or 4-tuple addressing in the IEEE 802.11 specification to provide data or management forwarding.

FIG. 18A shows an example of address translation for L2 uplink (ToDS) forwarding in the WiFi relay.

A station sends a data or management frame in MSDU or A-MSDU using 3-tuple address to the relay node. The relay node forwards the received packet from the station via translating the address of received packet into 4-tuple address in the forwarding MSDU or translate into 3-tuple using A-MSDU format embedded with the source address and destination address. For the short A-MSDU forwarding, the relay node may reduce one tuple in the 3-tuple address field in the forwarded packet in order to reduce overhead in the MAC header.

FIG. 18B shows another example of address translation for L2 uplink (FromDS) forwarding in the WiFi relay.

In order to improve transmission efficiency, a relay node could perform L2 forwarding for the data or management packet using the same TXOP owned by the requesting station to the next hop station so as to reduce the transmission latency in the in-band relay. The TXOP starts at the channel access by the requesting station and ends at a fixed duration. When the TXOP holder completes the transmission before the TXOP expires, TXOP holder could send the CP-End to release the medium for other stations to contend. When the requesting station indicates to transfer the ownership of TXOP to the relay node, the relay node would take over the transmission opportunity for the data forwarding to the next hop. In the current TXOP sharing, the relay node will forward the received data packet immediately after confirming reception of packet from the requesting station. The requesting station will lose the TXOP after transferring the ownership to the relay node, and may removes transmitted frame from buffer, and defers a fixed time such as (MAX_PPDU+ACK+2*SIFS) before starting next event.

However, this existing mechanism does not provide an indication of the data forwarding completion time, and how the relay node return the TXOP back to the request station or release the TXOP for contention by other stations. Therefore it may reduce the medium usage efficiency or cause the collision when the requesting station starts the next transmission in the fixed time that the relay node is forwarding the received data. This is because that the modulation and code scheme MCS used by the requesting station in the original transmission over V1 path and MCS used by the relay station for the data forwarding over V2 path may not be same due to their different channel conditions. In typical case the MCS used by relay node for the data forwarding could be lower rate than the MCS used by the requesting station to transmit data to the relay node over V1 path. When receiving a large MSDU, the relay node may segment it into a couple of PPDU frames and send to the next hop station. Therefore it is hard to estimate the next transmission time via a fixed amount of value. Since there is no mechanism for relay node to indicate the completion of the forwarding process, it would be difficult for the requesting stations to continue using the TXOP or for other stations to contend the medium. In addition, the next hop station such as AP may send some data to the original requesting station during receiving the data forwarded by the relay node in the same TXOP. If the original requesting station does not wait for the final acknowledgement of the forwarded data and goes to sleep after the fixed time, the relay node could not be able to transmit to the original requesting station the data received from the next hop during forwarding the previous data. This will cause relay node to buffer more data and increase risk of overload.

In order to address this issue, the present document provides for a deferred acknowledgement (DACK) indication mechanism for the relay node to notify the requesting station during forwarding the received data to the next hop station in the same TXOP. The relay node transmits a DACK indication to the requesting station to indicate that the requested packet has been received by the relay station and is being forwarded to the next hop station. The final ACK will be deferred to send back once the forwarded data is successfully received by the next hop station. During this period, the requesting station does not transmit anything. The requesting station can start the next transmission immediately after the previous packet is confirmed to be delivered, which the TXOP is returned from the relay node to the original requesting station. If the relay node decides to free up the TXOP for other stations, it would send a CF-End to finish the current TXOP. Other stations can reset NAV and start to contend the medium. Therefore it uses the medium efficiently and reduces the transmission collision caused by the requesting station using the fixed waiting time during the forwarding period. In addition, the deferred acknowledgement can provide the flow control mechanism to reduce the flooding on the relay node.

FIG. 19A show an example of signal flow for deferred ACK indication to be included in the ACK frame to the requesting station. FIG. 19B shows an example of signal flow for deferred ACK indication to be included in the forwarding frame to the next hop station in the same TXOP. The final ACK to be sent by the relay node once the forwarding packet is successfully acknowledged by the next hop station. FIG. 19C shows an example of signal flow of deferred ACK and final ACK indication inserted in the frame control of forwarding frame for two-ways data or management frame forwarding between stations controlled by the relay node.

1. A station transmits a data or management frame to the relay node.
2. After receiving the data or management frame successfully, the relay node sends a deferred acknowledgement (DACK) indication to the requesting station to indicate the packet has been received and is being forwarded to the next hop station. The final ACK will be deferred to send to the requesting station after the forwarded data is successfully received by the next hop station. The requesting station waits for the final ACK that indicates TXOP is returned from the relay node before sleeping or sending another data or management frame to the relay node in the same TXOP. The DACK indication could be included either in the ACK frame sent to the requesting station or in the PHY frame control header of the forwarding frame to the next hop station. If the relay node operates in the in-band forwarding, and the R-AP and R-STA use the same antenna for both links (V1 and V2) transmission, then the relay node may choose to include the DACK indication in the PHY frame control header on forwarding frame to the next hop station. Otherwise, the relay node may indicate DACK via the ACK frame sent to the requesting station.

3. The relay node forwards the received MSDU (or A-MSDU) to the next hop station. The relay node may transmit the received MSDU (or A-MSDU) in one frame or a couple of segment frames using same or different MCS rate to the next hop, which depends on the condition of relay channel to the next hop station.

4. The data frame is received by the next hop station successfully and a Block-ACK is sent to the relay node.

5. After the relay node receives the Block-ACK from the next hop station, which confirms the data forwarding is successful, it sends the final ACK to the requesting station to return the TXOP back to the requesting station if it has no data to send. If the relay node receives data from the next hop station with B-ACK or ACK, the relay node continues holding the TXOP and forward the received data from the next hop station to the original requesting station with the deferred ACK which indicates both the previous received data has been forwarded to the next hop station and successfully receives the data from the next hop station during the forwarding. Therefore the relay node could provide the two-way forwarding between the station and next hop station within the same TXOP. If the relay node does not receive ACK from the next hop station, it may start the retransmission procedure. After a couple of retransmission, if the relay node still does not receive ACK from the next hop, the relay node may claim that it loses the backhaul link and send an NACK to the requesting station. If the relay node decides to release the current TXOP, it then sends a CF-End and the medium is free up for contention by other stations. The relay node may embed the final ACK in the control frame in order to save the overhead. Since the original requesting station can be able to detect the transmission from the relay node to the next hop station, the relay node may use implicit final ACK to indicate the end of forwarding via setting MoreData=0 in the forwarded data packet. When the original requesting station detects the MoreData=0 in the forwarded packet and senses the medium idle for the time of at least ACK+2*SIFS, it may start to take back the TXOP from the relay node for the continuing transmission if necessary. If the original requesting station detects the field of MoreData=0 in the PHY frame control field of forwarded frame, but senses the medium becoming busy in time of ACK+2×SIFS after detecting idle, it assumes the TXOP is still held by the relay node for transmission with the next hop station and does not start the new transmission. The original requesting station checks the TXOP ownership later to determine whether the ownership of TXOP is returned back.

6. Once receiving the final ACK for the relay node, the requesting station can take back the TXOP and start another transmission if it has more packets to be sent. If receiving the CF-End sent by the relay node, the original requesting station shall use the contention mechanism to re-claim TXOP if the medium is not taken by other stations. If the original requesting station receives the forwarded data successfully (in FIG. 19C), the requesting station shall send an ACK to the relay station.

7. If the relay node has no data to send, it can release the medium by sending a CF-End to finish the current TXOP (see in FIG. 19C).

FIG. 20 shows an example of signal flows of transmission the deferred acknowledgement indication.

Three types of stations may be connected through a relay node: active transmitting station that are currently sending data frame to the relay node, active TIM station which listens the beacon frames periodically, and non-TIM station that may not listen to beacon frame in order to reduce power consumption.

FIG. 21 shows an example of signal flow for active transmitting station's flow control. In the FIG. 21, the station has been associated through the relay node.

1. A station sends one or more data frames to the relay node,

2. After receiving a data frame, the relay node sends an ACK frame to the station to indicate the transmitted data packet has been received. If the data buffer of the relay node is full or reaches a given threshold, the relay node could include flow control information in the ACK frame to notify the station to stop further data transmission for a given period (duration). The ACK frame could be a NDP ACK, a normal ACK frame or short ACK frame.

For the NDP ACK frame, the flow control indication and duration fields are used to indicate the flow control and transmission stop time. When the flow control indication bit is set to "1", the duration field may be included in the NDP ACK frame. The duration field indicates the time period that station will not transmit any data upon receiving the ACK frame.

For the normal ACK frame, the PM field and duration field are used for the flow control. When the PM field is set to "1", it indicates that the relay node is experiencing the data buffer full, the station will not send data frames within the "duration" period.

For the short ACK frame, the PM field is used for the flow control. When the PM field in the short ACK is set to "1", it indicates that no further transmission to the relay node is allowed. When the station receives the short ACK frame, it shall stop transmission until the next scheduled time.

During the "duration" period, the relay node may forward buffered data to the AP to reduce the amount of buffered data.

3. After the "duration" time, the station may resume transmission of data frames to the relay node if it still has data to send, and wait for the acknowledgement.

4. The relay node will send an ACK to the station after receiving the data frame. If its data buffer is not full, the relay node will include flow control information in the ACK frame to allow the further transmission from the station.

FIG. 22A shows an example of flow control for the non-TIM stations.

1. The non-TIM station wakes up and sends a PS-Poll frame to query whether data is buffered in the relay station, or to indicate it has data to send to the relay.

2. The relay node sends an ACK to the station after receiving the PS-Poll. If the data buffer of relay node is full or reaches to a given threshold, the relay node includes flow control information in the ACK frame to stop the station transmitting further data to the relay. The ACK frame could be a NDP ACK, normal ACK frame or short ACK frame.

For the NDP ACK frame, the flow control indication and duration fields are used to indicate the flow control and transmission stop time. When the flow control indication bit is set to "1", the duration field shall be included in the NDP ACK frame. The duration field indicates the time period that station shall not transmit any data upon receiving the ACK frame.

For the normal ACK frame, the PM field and duration field are used for the flow control. When the PM field is set to "1", it indicates that the relay node is experiencing the data buffer full and the station shall not send data frames within the "duration" period.

For the short ACK frame, the PM field is used for the flow control. When the PM field in the short ACK is set to "1", it indicates that no further transmission to the relay node is allowed. When the station receives the short ACK frame, it shall stop transmission until the next scheduled time.

3. When the station receives the ACK with flow control information (duration field), the station shall not send any data frame to the relay node in the "duration" period. After that, the station may resume the transmission to the relay node if it still has data to send.

4. The relay node will send an ACK to the station after receiving the data frame. If its data buffer is not full, the relay node will include flow control information in the ACK frame to allow the further transmission from the station The flow control information can also be included in other frames such as NDP-paging, Sync frame etc. to stop the further transmission from the station when the data buffer of the relay node is full.

FIG. 22B shows another example of flow control for the non-TIM stations via NDP-Page frame.

1. The relay station sends a NDP-Page frame at the beginning of TWT to the station with a "buffer full indication" and/or a "duration" field. When the relay node sets the "buffer full indication" field to "1" in the NDP-Page frame, it indicates that it experiences buffer full, and the station shall not transmit further data frames to the relay node.

2. The station receives the NDP-Page frame with the "buffer full indication" and/or "duration" field. It stops transmitting data for the period of "duration". The station may resume the transmission after the "duration" time. If the duration field is not included in the NDP-Page frame, the station shall stop the transmission until the next scheduled time.

The relay flow control mechanism could be used in TIM stations. A station that currently has buffered data unit within the AP is identified in a TIM. The Relay-AP includes TIM information in Beacon frames to notify stations with buffered data unit indication. A station can determine whether a data is buffered for it by periodically receiving and interpreting a TIM. In order to prevent the TIM station to transmit data to the relay node when the buffer of relay is full, the relay (Relay-AP) may include the flow control information in the beacon frames. When the relay buffer is full, the relay node sets the field of "buffer full indication" to "1". TIM station receiving the "buffer full indication" in the beacon frame stops further transmission to the relay. If the relay node includes the duration field in the beacon frame in addition to the "buffer full indication" field, the TIM station receiving the "buffer full indication" and "duration" fields stops further transmission for the "duration" time. The TIM station may resume the transmission after "duration" time.

When the TIM station in assigned slot sends a PS-Poll to the relay, the relay node could use the flow control mechanism (flow control information in ACK) for non-TIM station to control the transmission from the TIM station.

In one illustrative method, wireless communication services (e.g., internet connectivity, voice connectivity, etc.) between a plurality of wireless station and an access point are facilitated by establishing a first wireless communication link with the plurality of wireless stations over a first radio frequency interface, establishing a second wireless communication link with the access point over a second radio frequency interface, and operating the second wireless communication link to provide a backhaul connectivity between the plurality of wireless stations and the access point. The method may further include operating the first wireless communication link on a same radio frequency channel as that for the second wireless communication link. The method may further include operating the first wireless communication link on a different radio frequency channel as that for the second wireless communication link. In some implementations, the backhaul connectivity is implemented using a protocol different from the protocol used for communication with the plurality of wireless stations (e.g., a wireline protocol used for data communication among access points). As previously described, the method may be implemented in a wireless relay apparatus.

In some implementations, a wireless relay apparatus for facilitating wireless communication services between a plurality of wireless stations and an access point includes a first radio frequency interface module that establishes a first wireless communication link with the plurality of wireless stations over a first radio frequency interface, a second radio frequency interface module that establishes a second wireless communication link with the access point over a second radio frequency interface and a backhaul module that operates the second wireless communication link to provide a backhaul connectivity between the plurality of wireless stations and the access point.

In some implementations, a wireless communication system includes a plurality of wireless stations communicating using a first air interface protocol, a relay device and an access point, wherein the plurality of wireless stations communicate with entities in a wide area network via the access point without establishing a direct wireless link with the access point, and wherein the relay device communicates with the plurality of wireless stations using the first air interface protocol and communicates with the access point using a second, different, wireless communication protocol.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of facilitating wireless communication services between a plurality of wireless stations and an access point, comprising:

establishing a first wireless communication link between an integrated relay station performing access point functionality and the plurality of wireless stations over a first radio frequency interface, wherein the integrated relay station includes multiple access points (AP) and multiple stations (STA) with each AP and STA operable on its own frequency channel;

establishing a second wireless communication link between the integrated relay station and the access point over a second radio frequency interface;

establishing a third wireless communication link between the integrated relay station and the access point over a third radio frequency interface; and operating the second wireless communication link and the third wireless communication link in parallel to provide a backhaul connectivity to the plurality of wireless stations, wherein the integrated relay station is operable to selectively switch the second wireless communication link between the integrated relay station and the access point to the third wireless communication link between the integrated relay station and the access point based on a condition of the second wireless communication link, and wherein the method further comprises:

operating the integrated relay station to forward, after receiving a first data packet from one of the plurality of wireless stations, the first data packet to a next hop station and provide a deferred acknowledgement indication to the wireless station, in a same transmission opportunity owned by the wireless station, indicating that the first data packet is being sent to the next hop station to cause the wireless station to stop transmitting additional data packets to the integrated relay station until the first data packet is confirmed to be delivered to the next hop station to reduce transmission collisions, and operating the integrated relay station to forward, after receiving a second data packet from the next hop station, the second data packet to the wireless station and provide a deferred acknowledgement indication to the next hop station, in the same transmission opportunity owned by the wireless station, indicating that the second data packet is being sent to the wireless station to cause the next hop station to stop transmitting additional data packets to the integrated relay station until the second data packet is confirmed to be delivered to the mobile station to allow a two-way data forwarding to reduce transmission collisions.

2. The method of claim 1, further comprising:
operating the first wireless communication link on a same radio frequency channel as that for the second wireless communication link.

3. The method of claim 1, further comprising:
operating the first wireless communication link on a different radio frequency channel as that for the second wireless communication link.

4. The method of claim 1, wherein the backhaul link is implemented using a protocol different from the protocol used for communication with the plurality of wireless stations.

5. The method of claim 1, further including:
authenticating and associating, prior to establishing the first wireless communication link, with the access point.

6. The method of claim 1, further including;
selectively establishing, without terminating the first wireless communication link, another wireless communication link with another access point; and
de-associating the second wireless communication link with the access point.

7. The method of claim 1, wherein the integrated relay station is further operable to:
provide, after successfully sending the packet to the next hop station, a final acknowledgement to the wireless station to cause the wireless station to resume transmitting additional packets to the integrated relay station.

8. The method of claim 1, wherein the integrated relay station is further operable to:
provide an acknowledgement to the wireless station, the acknowledgement including a duration field indicative of a time for which the wireless station is not to send additional packets.

9. An integrated wireless relay apparatus for facilitating wireless communication services between a plurality of wireless stations and an access point, comprising:
multiple communication interfaces integrated through interconnection links, wherein each communication interface is operable on its own radio frequency channel,
an antenna array common to the multiple communication interfaces;
a processor;
one or more memories configured to store instructions, when executed by the processor, causing the processor to establish a first wireless communication link with the plurality of wireless stations over a first radio frequency interface, establish a second wireless communication link with the access point over a second radio frequency interface, and establish a third wireless communication link with the access point over a third radio frequency interface;
wherein the processor operates the second wireless communication link and the third wireless communication link simultaneously to provide a backhaul link for data forwarding to the plurality of wireless stations,
wherein the integrated relay apparatus is operable to selectively switch the second wireless communication link between the integrated relay apparatus and the access point to a third wireless communication link between the integrated relay apparatus and the access point based on a condition of the second wireless communication link, and wherein the processor is further configured to forward, after receiving a first data packet from one of the plurality of wireless stations, the first data packet to a next hop station and provide a deferred acknowledgement indication to the wireless station, in a same transmission opportunity owned by the wireless station, indicating that the first data packet is being sent to the next hop station to cause the wireless station to stop transmitting additional data packets to the integrated relay apparatus until the first data packet is confirmed to be delivered to the next hop station to reduce transmission collisions; and to forward, after receiving a second data packet from the next hop station, the second data packet to the wireless station and provide a deferred acknowledgement indication to the next hop station, in the same transmission opportunity owned by the wireless station, indicating that the second data packet is being sent to the wireless station to cause the next hop station to stop transmitting additional data packets to the integrated relay apparatus until the second data packet is confirmed to be delivered to the mobile station to allow a two-way data forwarding to reduce transmission collisions.

10. The apparatus of claim 9,
wherein the processor operates the first wireless communication link on a same radio frequency channel as that for the second wireless communication link.

11. The apparatus of claim 9,
wherein the processor operates the first wireless communication link on a different radio frequency channel as that for the second wireless communication link.

12. The apparatus of claim 9, wherein the backhaul link is implemented using a protocol different from the protocol used for communication with the plurality of wireless stations.

13. The apparatus of claim 9, wherein the first radio frequency interface module receives a packet from one of the plurality of wireless stations; and
an acknowledgement module provides an acknowledgement to the wireless station, the acknowledgement including a duration field indicative of a time for which the wireless station is not to send additional packets.

14. The apparatus of claim 9, wherein the integrated relay station is further operable to provide, after successfully sending the packet to the next hop station, a final acknowledgement to the wireless station to cause the wireless station to resume transmitting additional packets to the integrated relay station.

15. A computer program product comprising a computer-readable non-transitory, program medium having code stored thereon, the code, when executed, causing a processor to implement a method of facilitating wireless communication services between a plurality of wireless stations and an access point, the method comprising:
establishing a first wireless communication link between an integrated relay station performing access point functionality and the plurality of wireless stations over a first radio frequency interface, wherein the integrated relay station includes multiple access points (AP) and multiple stations (STA) with each AP and STA operable on its own frequency channel;
establishing a second wireless communication link between the integrated relay station and the access point over a second radio frequency interface;
establishing a third wireless communication link between the integrated relay station and the access point over a third radio frequency interface; and operating the second wireless communication link and the third wireless communication link in parallel to provide a backhaul connectivity to the plurality of wireless stations, wherein the integrated relay station is operable to selectively switch the second wireless communication link between the integrated relay station and the access point to the third wireless communication link between the integrated relay station and the access point based on a condition of the second wireless communication link, and wherein the method further comprises:

operating the integrated relay station to forward, after receiving a first data packet from one of the plurality of wireless stations, the first data packet to a next hop station and provide a deferred acknowledgement indication to the wireless station, in a same transmission opportunity owned by the wireless station, indicating that the first data packet is being sent to the next hop station to cause the wireless station to stop transmitting additional data packets to the integrated relay station until the first data packet is confirmed to be delivered to the next hop station to reduce transmission collisions caused by a fixed waiting time of the wireless station, and operating the integrated relay station to forward, after receiving a second data packet from a next hop station, the second data packet to the wireless station and provide a deferred acknowledgement indication to the next hop station, in the same transmission opportunity owned by the wireless station, indicating that the second data packet is being sent to the wireless station to cause the next hop station to stop transmitting additional data packets to the integrated relay station until the second data packet is confirmed to be delivered to the mobile station to allow a two-way data forwarding to reduce transmission collisions.

16. The computer program product of claim 15, wherein the method further comprises:

operating the first wireless communication link on a same radio frequency channel as that for the second wireless communication link.

17. The computer program product of claim 16, wherein the method further comprises:

operating the first wireless communication link on a different radio frequency channel as that for the second wireless communication link.

18. The computer program product of claim 16, wherein the backhaul link is implemented using a protocol different from the protocol used for communication with the plurality of wireless stations.

19. The computer program product of claim 15, wherein the integrated relay station is further operable to provide, after successfully sending the packet to the next hop station, a final acknowledgement to the wireless station to cause the wireless station to resume transmitting additional packets to the integrated relay station.

20. A wireless communication system comprising:

a plurality of wireless stations communicating using a first air interface protocol;

an integrated relay device comprising multiple communication interfaces integrated through interconnection links, wherein each communication interface is operable on its own radio frequency channel, and an access point, wherein the plurality of wireless stations communicate with entities in a wide area network via the access point without establishing a direct wireless link with the access point, and wherein the integrated relay device communicates with the plurality of wireless stations using the first air interface protocol and communicates with the access point using a second, different, wireless communication protocol, wherein the access point is operable to simultaneously form a first relay link with the integrated wireless relay device over a first frequency channel and a second relay link with the integrated wireless relay device over a second frequency channel, the first and second relay links providing a backhaul connectivity to the plurality of wireless stations, wherein the integrated relay station is operable to forward, after receiving a first data packet from one of the plurality of wireless stations, the first data packet to a next hop station and provide a deferred acknowledgement indication to the wireless station, in a same transmission opportunity owned by the wireless station, indicating that the first data packet is being sent to the next hop station to cause the wireless station to stop transmitting additional packets to the integrated relay station until the first data packet is confirmed to be delivered to the next hop station to reduce transmission collisions, and wherein the integrated relay station is operable to forward, after receiving a second data packet from the next hop station, the second data packet to the wireless station and provide a deferred acknowledgement indication to the next hop station, in the same transmission opportunity owned by the wireless station, indicating that the second data packet is being sent to the wireless station to cause the next hop station to stop transmitting additional data packets to the integrated relay station until the second data packet is confirmed to be delivered to the mobile station to allow a two-way data forwarding to reduce transmission collisions.

21. The system of claim 20, wherein the integrated relay station is further operable to provide, after successfully sending the packet to the next hop station, a final acknowledgement to the wireless station to cause the wireless station to resume transmitting additional packets to the integrated relay station.

* * * * *